United States Patent
Kim et al.

(10) Patent No.: US 9,723,369 B2
(45) Date of Patent: Aug. 1, 2017

(54) MOBILE TERMINAL AND CONTROLLING METHOD THEREOF FOR SAVING AUDIO IN ASSOCIATION WITH AN IMAGE

(71) Applicant: LG ELECTRONICS INC., Seoul (KR)

(72) Inventors: Jonghwan Kim, Seoul (KR); Hyungjun Jin, Seoul (KR); Heejung Ohe, Seoul (KR); Hyungjin Kim, Seoul (KR); Seungtae Park, Seoul (KR); Sangyeong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 14/543,952

(22) Filed: Nov. 18, 2014

(65) Prior Publication Data
US 2015/0147048 A1    May 28, 2015

(30) Foreign Application Priority Data

Nov. 28, 2013 (KR) .......... 10-2013-0146561
Dec. 18, 2013 (KR) .......... 10-2013-0157859

(51) Int. Cl.
| | |
|---|---|
| *H04N 5/93* | (2006.01) |
| *H04N 21/485* | (2011.01) |
| *G11B 27/036* | (2006.01) |
| *G06F 3/16* | (2006.01) |

(Continued)

(52) U.S. Cl.
CPC ......... *H04N 21/4852* (2013.01); *G06F 3/167* (2013.01); *G11B 27/036* (2013.01); *H04M 1/72522* (2013.01); *H04N 1/00185* (2013.01); *H04N 1/00403* (2013.01); *H04N 1/00411* (2013.01); *H04M 1/72547* (2013.01); *H04M 1/72558* (2013.01); *H04M 2250/22* (2013.01)

(58) Field of Classification Search
CPC .......................... H04N 21/4852; G11B 27/036
USPC ....................................................... 386/285
See application file for complete search history.

(56) References Cited

U.S. PATENT DOCUMENTS

| | | | |
|---|---|---|---|
| 6,128,037 A * | 10/2000 | Anderson | H04N 1/0044 348/231.4 |
| 7,035,418 B1 * | 4/2006 | Okuno | H04N 7/15 348/14.05 |

(Continued)

FOREIGN PATENT DOCUMENTS

| | | | |
|---|---|---|---|
| EP | 1028583 A1 * | 8/2000 | |
| EP | 2487584 A2 | 2/2011 | |

(Continued)

OTHER PUBLICATIONS

Shiraki, Machine generated translation of JP2006350592A, Dec. 2006.*

*Primary Examiner* — David Harvey
(74) *Attorney, Agent, or Firm* — Birch, Stewart, Kolasch & Birch, LLP

(57) ABSTRACT

A method of controlling a mobile terminal, and which includes displaying an image on a touchscreen of the mobile terminal; receiving an audio synthesis command for synthesizing audio with the image; saving at least one audio candidate in association with the image, based on the received audio synthesis command; and displaying an indicator on the touchscreen indicating the at least one audio candidate is saved with the image.

14 Claims, 35 Drawing Sheets

(51) Int. Cl.
*H04N 1/00* (2006.01)
*H04M 1/725* (2006.01)

(56) References Cited

U.S. PATENT DOCUMENTS

| | | | | |
|---|---|---|---|---|
| 7,376,332 B2* | 5/2008 | Ikeda | G06F 17/30265 | 386/239 |
| 7,493,559 B1* | 2/2009 | Wolff | G06F 17/241 | 715/727 |
| 7,587,671 B2* | 9/2009 | Saft | G06F 17/30899 | 382/201 |
| 7,805,681 B2* | 9/2010 | Hansson | G06F 17/30265 | 715/751 |
| 8,255,795 B2* | 8/2012 | Saft | G06F 17/30899 | 715/209 |
| 8,542,982 B2* | 9/2013 | Eggink | G11B 27/034 | 386/285 |
| 8,760,552 B2* | 6/2014 | Nonaka | H04N 5/2251 | 348/333.02 |
| 9,007,524 B2* | 4/2015 | Kaine | H04N 9/802 | 345/156 |
| 9,108,104 B2* | 8/2015 | Abe | A63F 13/00 | |
| 9,247,144 B2* | 1/2016 | Jung | G06F 17/30743 | |
| 9,343,053 B2* | 5/2016 | Harel | G10H 1/368 | |
| 2001/0003813 A1* | 6/2001 | Sugano | G06F 17/30743 | 704/500 |
| 2001/0056434 A1* | 12/2001 | Kaplan | G06F 17/30017 | |
| 2002/0057294 A1* | 5/2002 | Ejima | G06F 3/04886 | 715/792 |
| 2004/0088326 A1* | 5/2004 | Lin | G06F 17/30017 | |
| 2004/0263661 A1* | 12/2004 | Okisu | H04N 1/32101 | 348/333.02 |
| 2005/0091062 A1* | 4/2005 | Burges | G06F 17/30743 | 704/273 |
| 2005/0158037 A1* | 7/2005 | Okabayashi | G10H 1/368 | 386/248 |
| 2005/0201565 A1* | 9/2005 | Choi | G06F 3/167 | 381/61 |
| 2006/0092291 A1* | 5/2006 | Bodie | H04N 1/00307 | 348/231.99 |
| 2006/0193623 A1* | 8/2006 | Funakura | G03B 17/00 | 396/312 |
| 2006/0193624 A1* | 8/2006 | Mino | G03B 17/00 | 396/312 |
| 2006/0265643 A1* | 11/2006 | Saft | G06F 17/30899 | 715/209 |
| 2008/0147216 A1* | 6/2008 | Pomerantz | G11B 33/06 | 700/94 |
| 2008/0256100 A1* | 10/2008 | van de Sluis | G06F 17/30749 | |
| 2008/0295028 A1* | 11/2008 | Nagasaka | G06F 3/04817 | 715/810 |
| 2009/0217167 A1* | 8/2009 | Sugama | G06F 17/30047 | 715/727 |
| 2009/0300500 A1* | 12/2009 | Arrasvuori | G11B 27/034 | 715/723 |
| 2010/0082677 A1* | 4/2010 | Athsani | G06F 17/30997 | 707/783 |
| 2010/0216442 A1* | 8/2010 | Kim | H04M 1/2745 | 455/415 |
| 2011/0008013 A1* | 1/2011 | Zhao | G06F 17/30056 | 386/241 |
| 2011/0039598 A1* | 2/2011 | Tang | H04N 5/772 | 455/556.1 |
| 2011/0267353 A1* | 11/2011 | Johansson | G06F 3/0488 | 345/440 |
| 2012/0098946 A1* | 4/2012 | Seung | H04N 21/4307 | 348/61 |
| 2012/0254168 A1* | 10/2012 | Shibata | H04N 21/4755 | 707/736 |
| 2013/0028424 A1* | 1/2013 | Kim | H04S 1/002 | 381/17 |
| 2014/0314391 A1* | 10/2014 | Kim | G11B 27/11 | 386/248 |
| 2014/0376740 A1* | 12/2014 | Shigenaga | G06F 21/60 | 381/92 |
| 2015/0023524 A1* | 1/2015 | Shigenaga | H04R 1/326 | 381/92 |
| 2016/0086368 A1* | 3/2016 | Laaksonen | G06T 13/80 | 345/473 |

FOREIGN PATENT DOCUMENTS

| | | | |
|---|---|---|---|
| JP | 04177421 A | * | 6/1992 |
| JP | 2000148775 A | * | 5/2000 |
| JP | 3298196 B2 | * | 7/2002 |
| JP | 2003141859 A | * | 5/2003 |
| JP | 2006350592 A | * | 12/2006 |
| JP | 2007158396 A | * | 6/2007 |
| JP | 2008259075 A | * | 10/2008 |
| KR | 20040050573 A | * | 6/2004 |
| WO | WO 2011/019467 A1 | | 2/2011 |

* cited by examiner

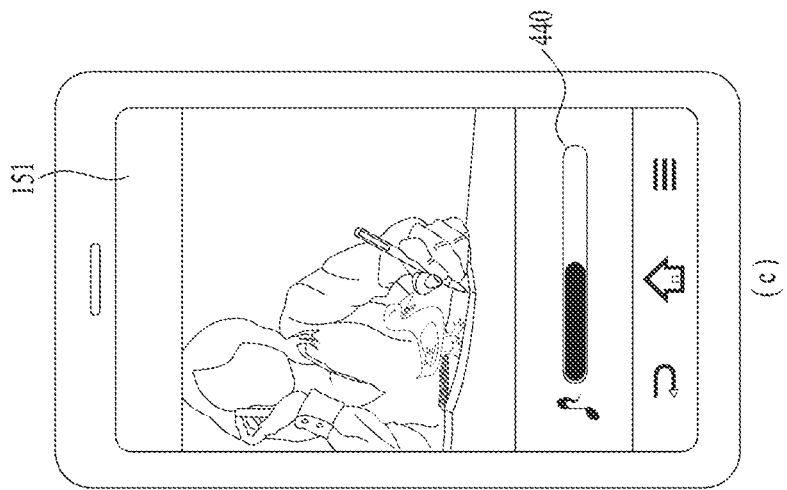
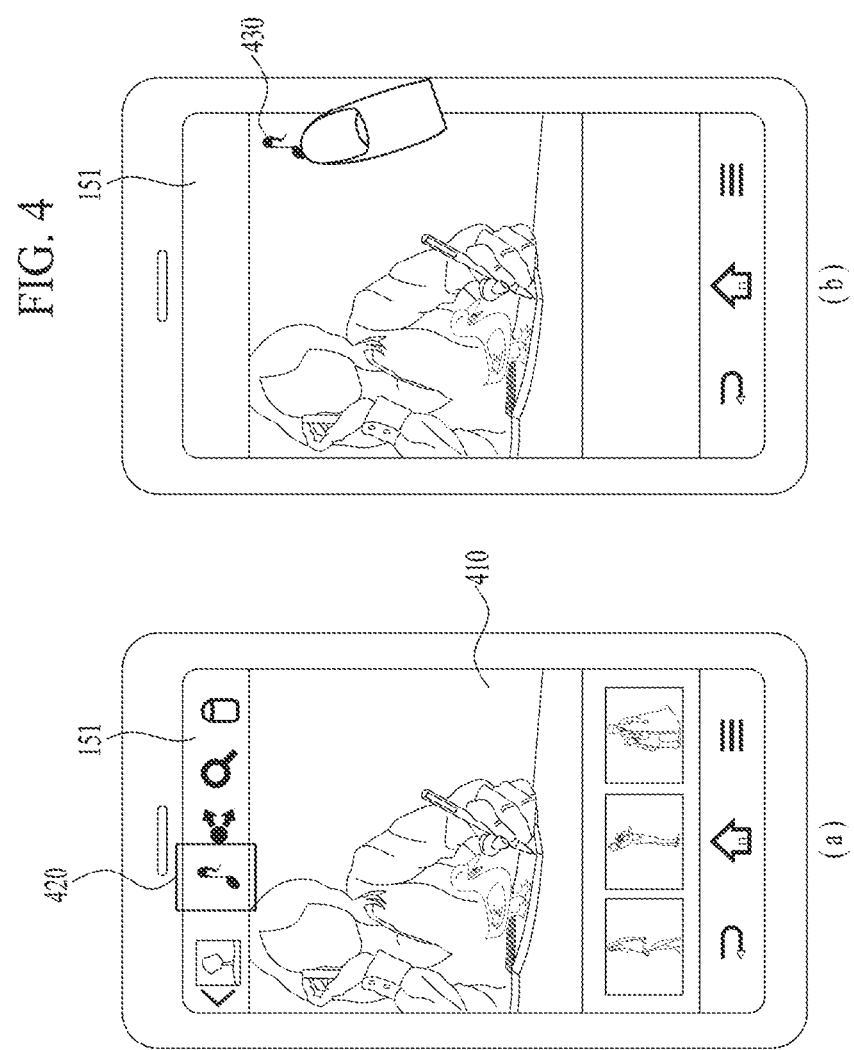
FIG. 4

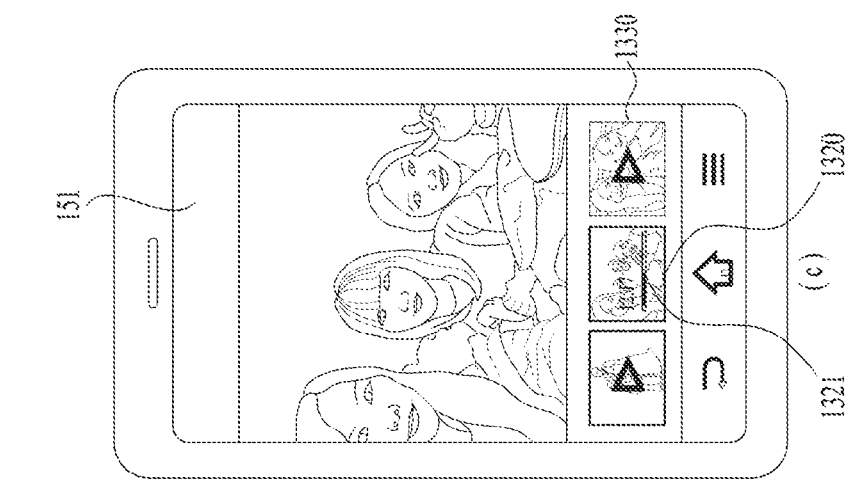
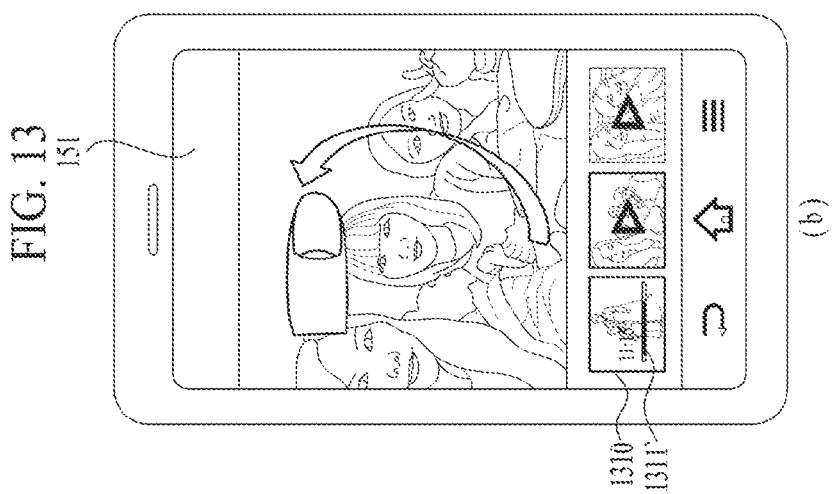
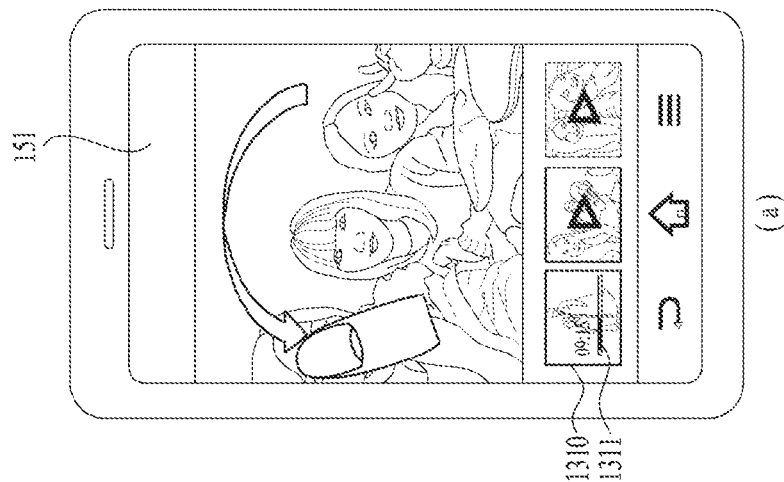
FIG. 13

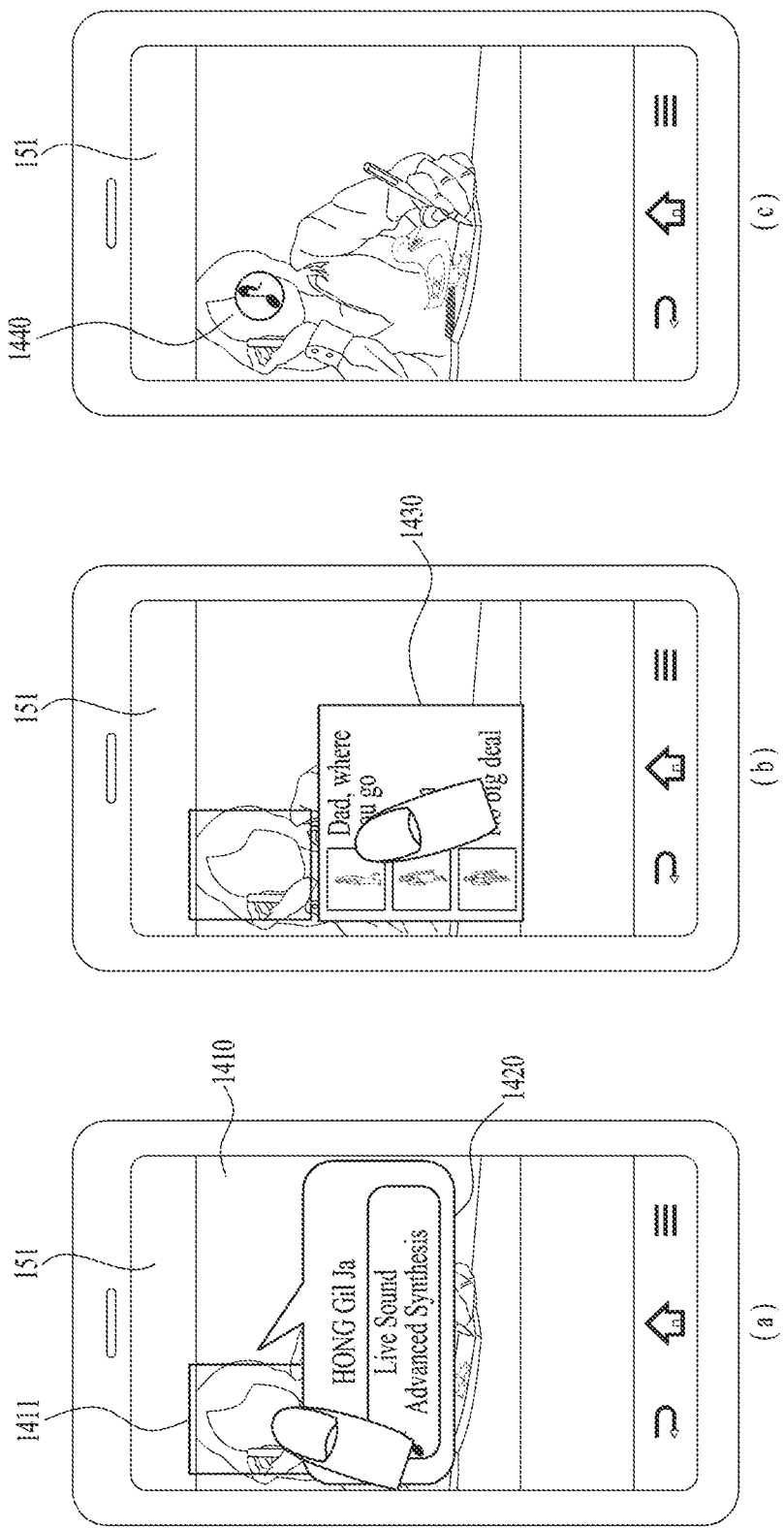

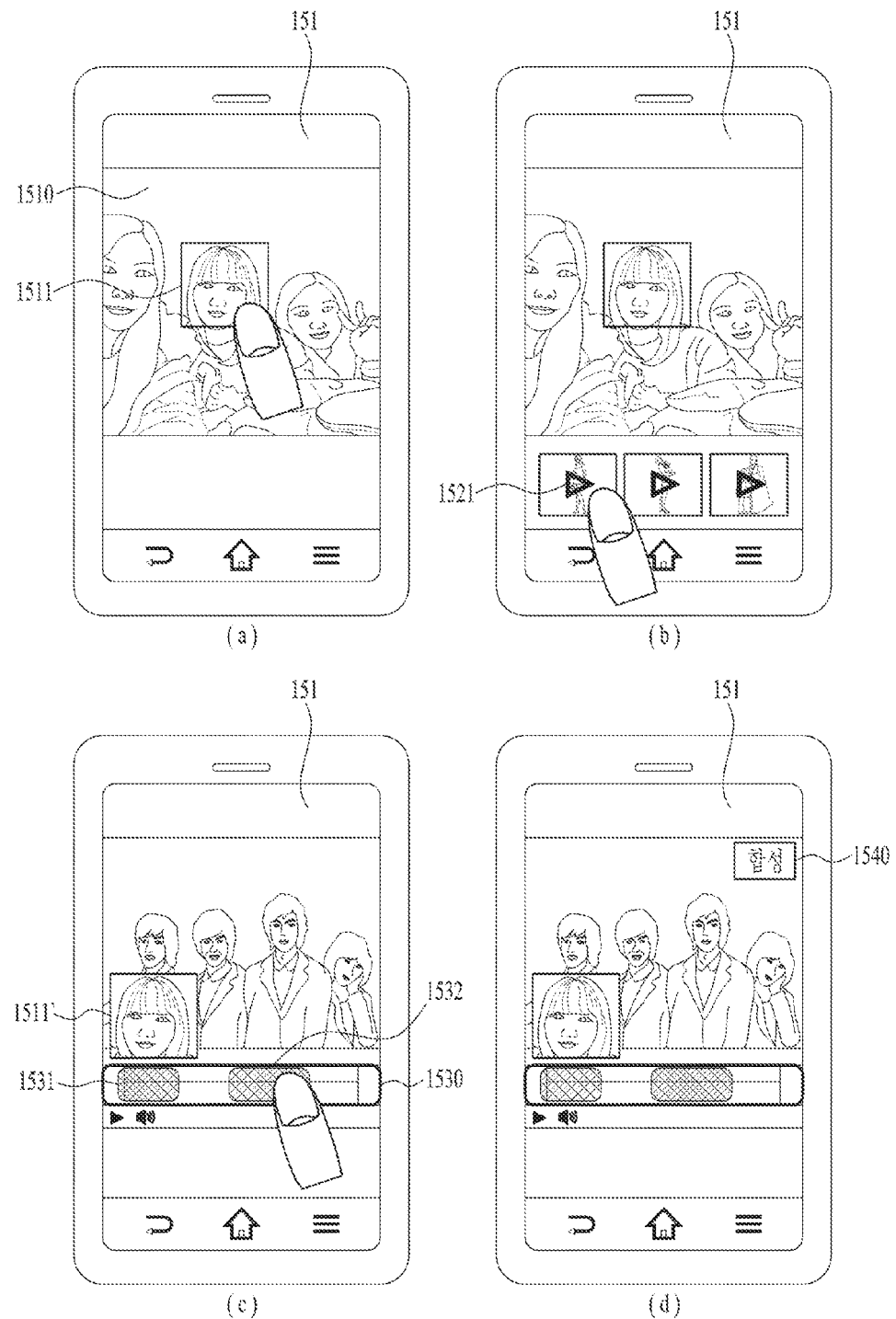

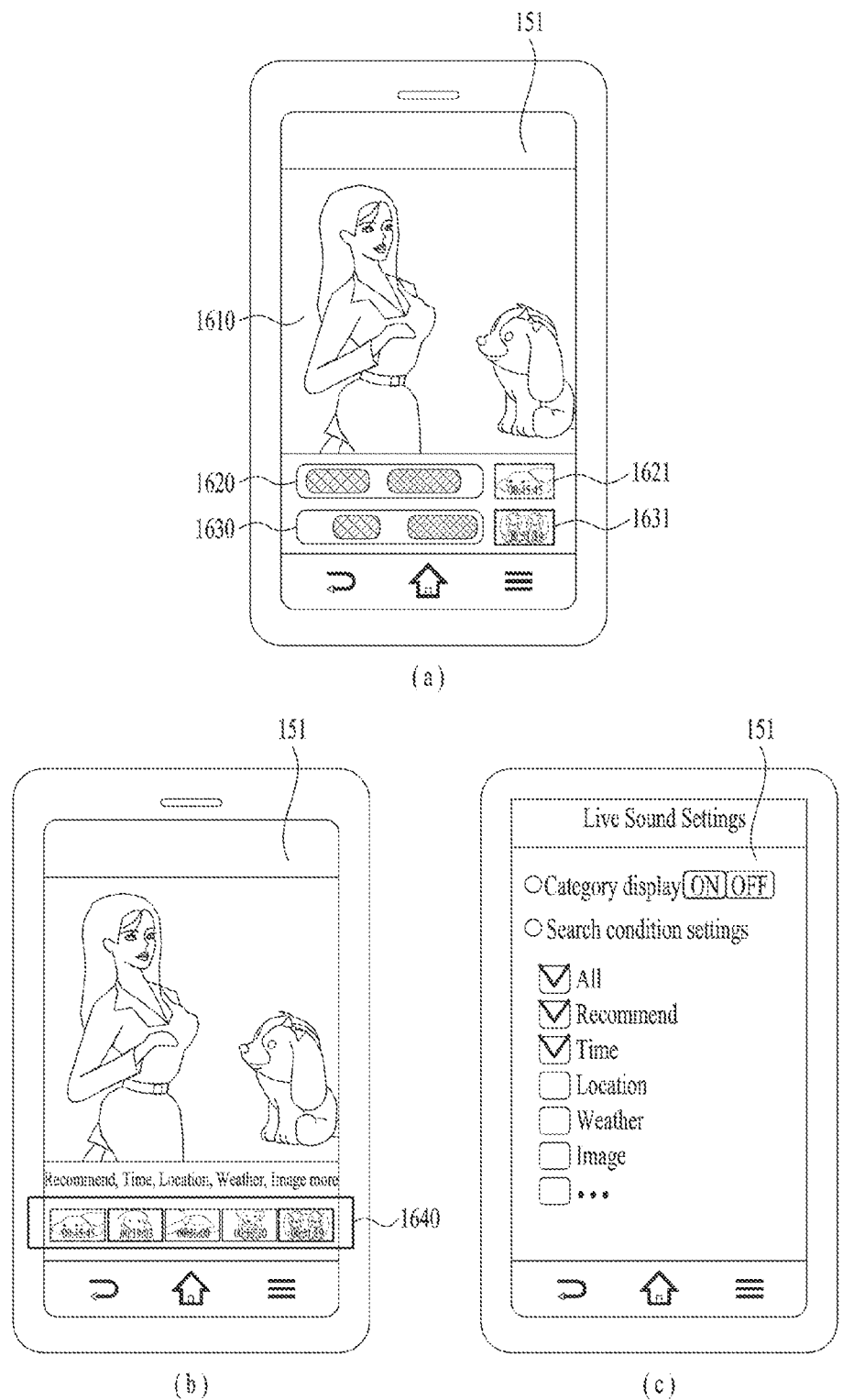

FIG. 18
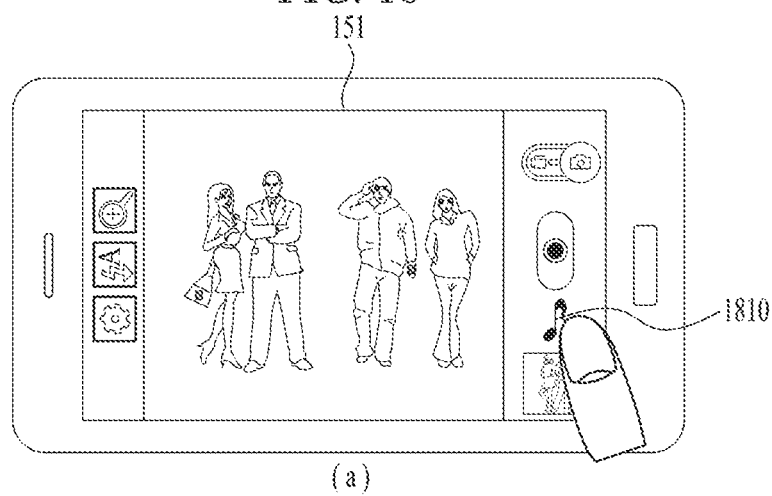
(a)
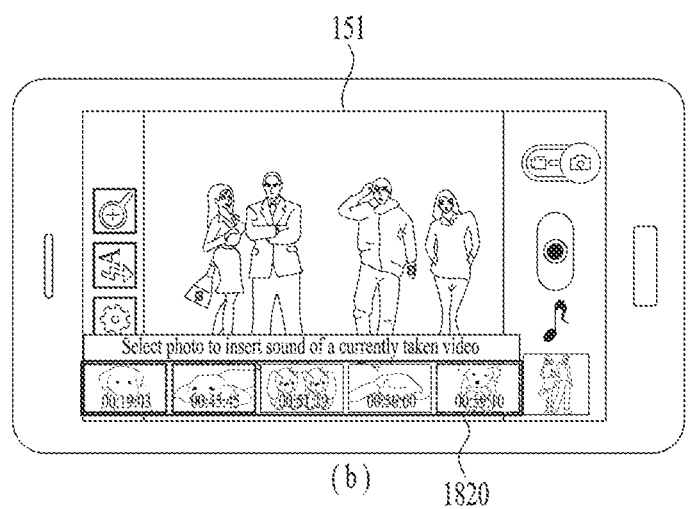
(b)

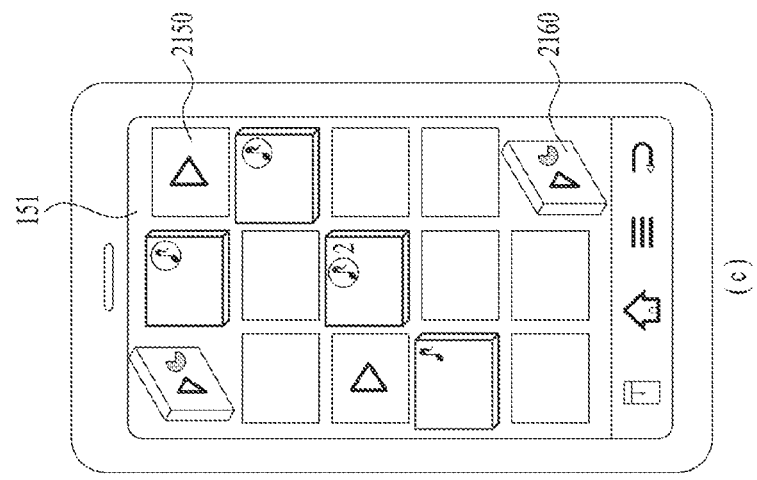
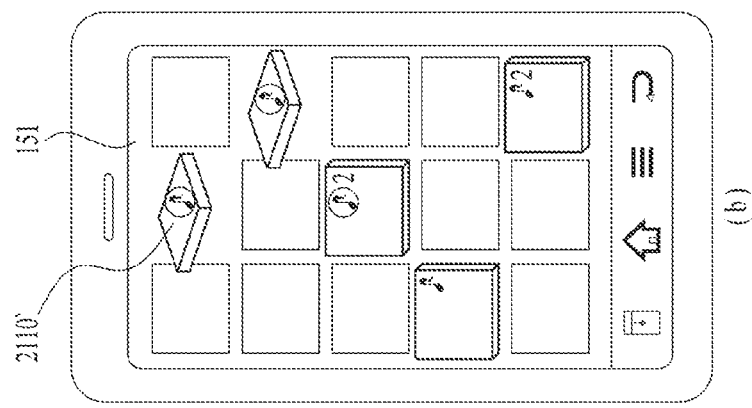
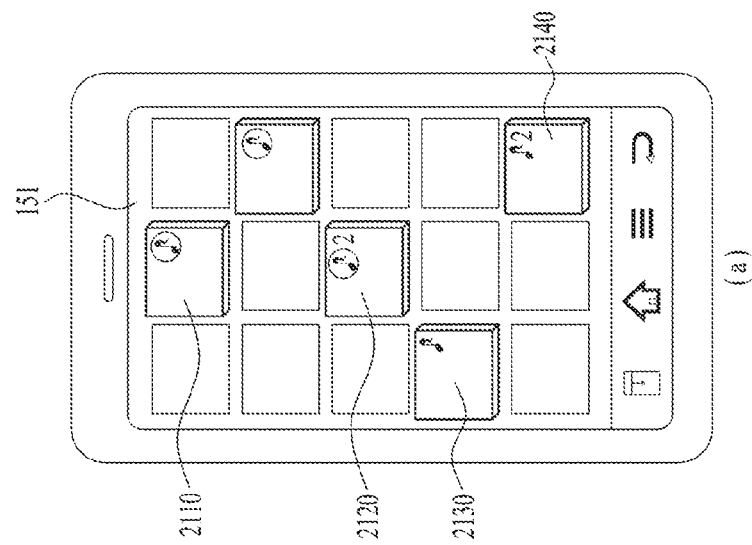
FIG. 21

FIG. 22
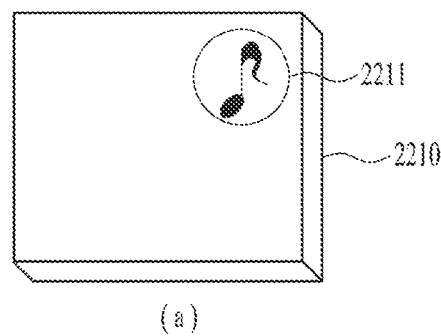
(a)
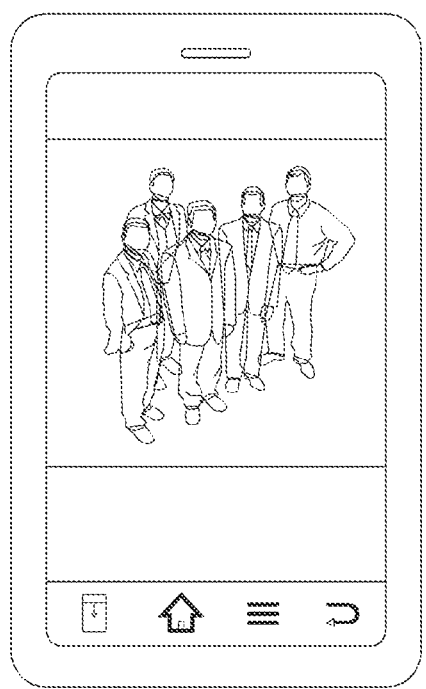
(b)
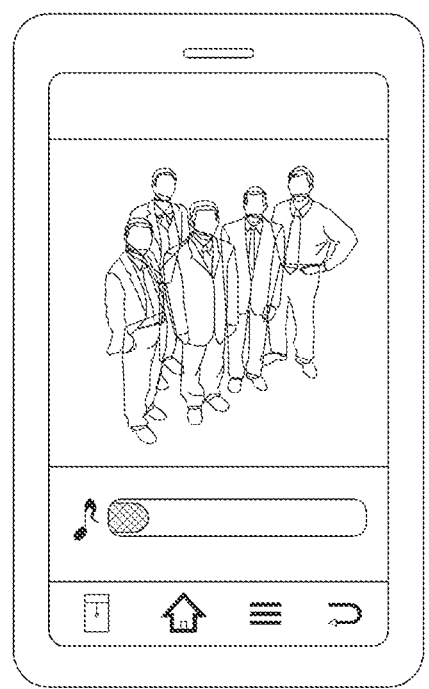
(c)

FIG. 23
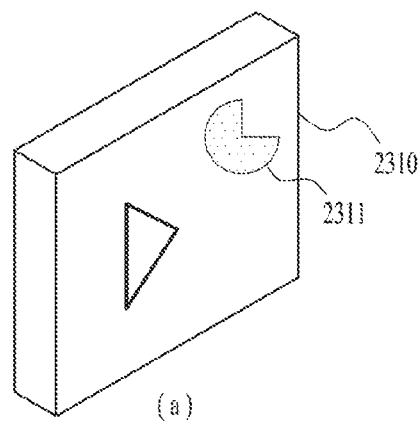
(a)
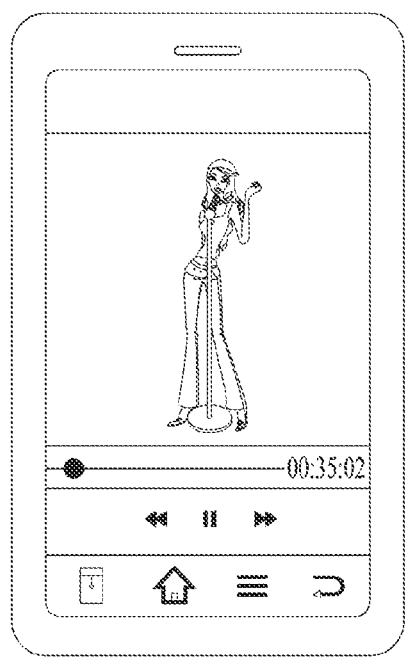
(b)
(c)

FIG. 32
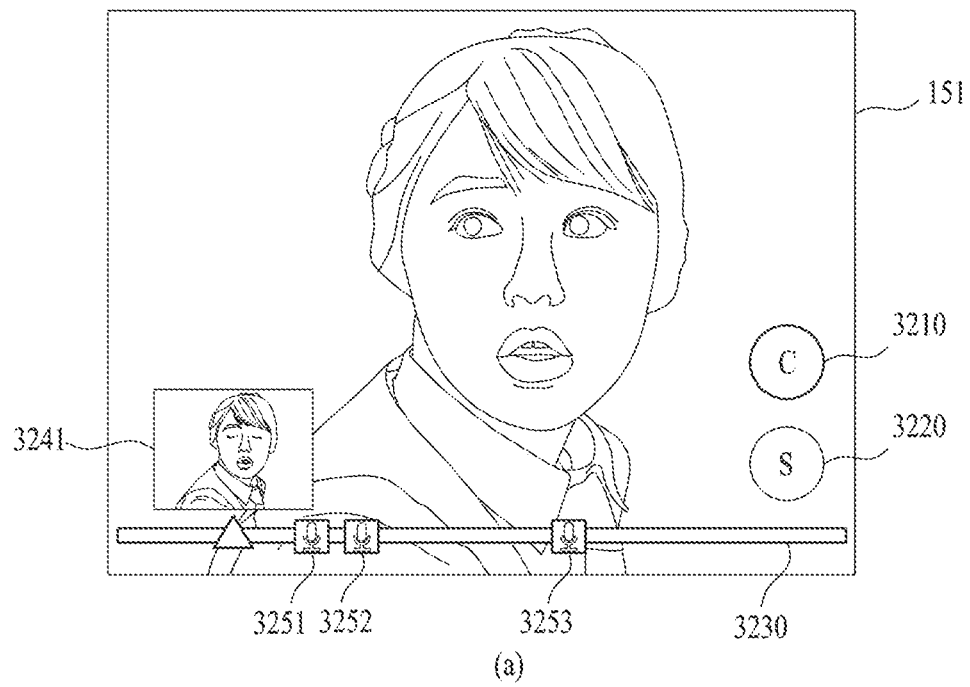
(a)
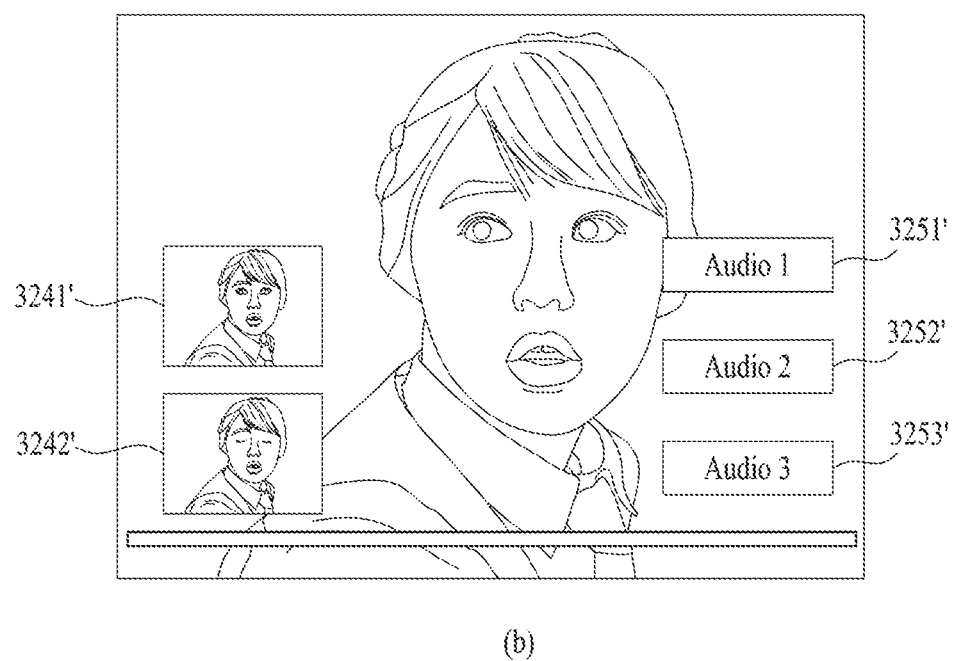
(b)

MOBILE TERMINAL AND CONTROLLING METHOD THEREOF FOR SAVING AUDIO IN ASSOCIATION WITH AN IMAGE

Pursuant to 35 U.S.C. §119(a), this application claims the benefit of earlier filing date and right of priority to Korean Applications No. 10-2013-0146561, filed on Nov. 28, 2013, and No. 10-2013-0157859, filed on Dec. 18, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for outputting an image together with audio.

Discussion of the Related Art

Generally, terminals can be classified into mobile/portable terminals and stationary terminals. The mobile terminals can be further classified into handheld terminals and vehicle mounted terminals. As functions of the terminal are getting diversified, the terminal tends to be implemented as a multimedia player provided with composite functions such as photographing of photos or videos, playback of music or video files, game play, broadcast reception and the like for example.

Recently, as performance of a mobile terminal is increasingly enhanced, mobile terminals capable of outputting at least two multimedia contents of different types simultaneously or creating source contents for them are released in the markets. Hence, the demand for a mobile terminal capable of creating and outputting source contents in various ways such as saving a content of one type in association with content of another type is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which an image can be output together with audio.

In particular, one object of the present invention is to provide a mobile terminal and controlling method thereof, by which audios suitable for an image can be extracted from various sources and then synthesized together.

Another object of the present invention is to provide a mobile terminal and controlling method thereof, by which various additional functions can be provided through audio corresponding to an image.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a mobile terminal according to one embodiment of the present invention may include the steps of selecting an image, if an audio synthesis command is input, searching for at least one audio candidate related to the selected image, and saving one of the found at least one audio candidate in association with the selected image.

In another aspect of the present invention, as embodied and broadly described herein, a mobile terminal according to one embodiment of the present invention may include a touchscreen, a memory, and a controller, if an audio synthesis command is input, searching for at least one audio candidate related to the selected image, the controller saving one of the found at least one audio candidate in association with the selected image.

In further aspect of the present invention, as embodied and broadly described herein, a mobile terminal according to another embodiment of the present invention may include a camera, an audio input unit, a touchscreen, a memory, and a controller, if an image is taken through the camera, receiving an input of at least one audio from the audio input unit to correspond to the taken image, the controller controlling the input audio to be saved in the memory by corresponding to the taken image. In this instance, the controller recognizes at least one subject from the taken image and can control the input at least one audio to be saved by corresponding to the recognized at least one subject.

In another further aspect of the present invention, as embodied and broadly described herein, a method of controlling a mobile terminal according to another embodiment of the present invention may include the steps of taking an image through a camera, receiving an input of at least one audio from an audio input unit to correspond to the taken image, and saving the input audio in a memory to correspond to the taken image. In this instance, the saving step may include the steps of recognizing at least one subject from the taken image and saving the input at least one audio to correspond to the recognized at least one subject.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram illustrating one example of automatically determining an audio to synthesize with an image in a mobile terminal according to one embodiment of the present invention;

FIG. 13 is a diagram illustrating another example of a method of discovering a found audio after finding a plurality of audio candidates to be synthesized with an image in a mobile terminal according to one embodiment of the present invention;

FIG. 14A and FIG. 14B are diagrams illustrating one example of selecting a prescribed one of audio candidates found by face recognition in a mobile terminal according to one embodiment of the present invention;

FIG. 15 is a diagram illustrating one example of discovering a source of an audio candidate found by face recognition in a mobile terminal according to one embodiment of the present invention;

FIG. 16 is a diagram illustrating one example of various display methods of an audio candidate list applicable to one embodiment of the present invention and setting menus thereof;

FIG. 18 is a diagram illustrating one example of a process for selecting an audio candidate to be synthesized with an audio included in a video in the course of taking the video in a mobile terminal according to one embodiment of the present invention;

FIG. 21 is a diagram illustrating one example of a process for displaying an audio synthesized image and a source video, which provides an audio to an image, in thumbnail view mode in a mobile terminal according to one embodiment of the present invention;

FIG. 22 is a diagram illustrating one example of a function performed through a thumbnail corresponding to an audio synthesized image in a mobile terminal according to one embodiment of the present invention;

FIG. 23 is a diagram illustrating one example of a function performed through a thumbnail corresponding to a video, which provides an audio to another image, in a mobile terminal according to one embodiment of the present invention;

FIG. 32 is a diagram illustrating one example of a method of creating an image content including an audio using a video source in a mobile terminal according to further embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the invention only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
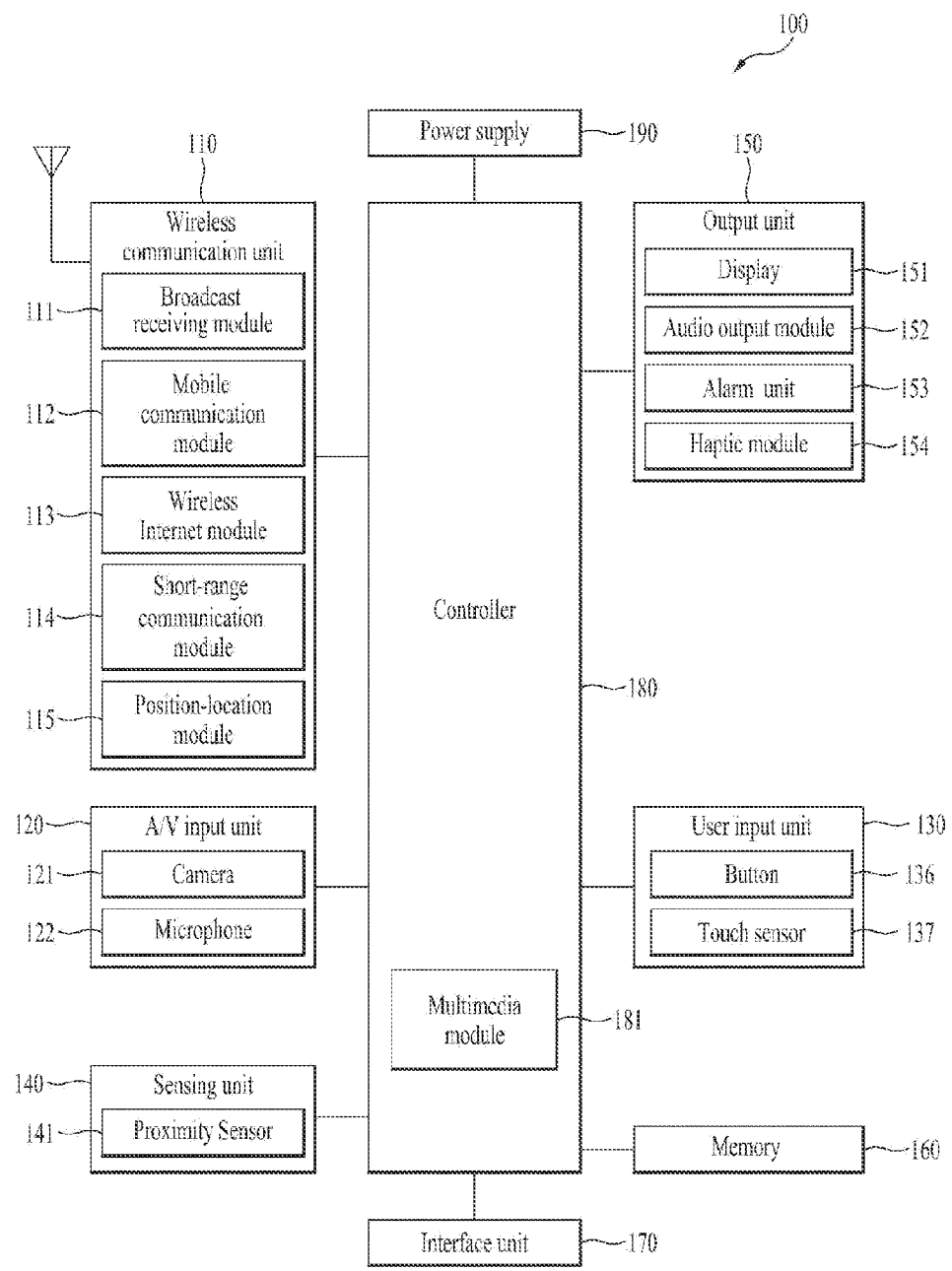
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems. The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution). Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154. A projector module may also be included.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160. The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 can include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
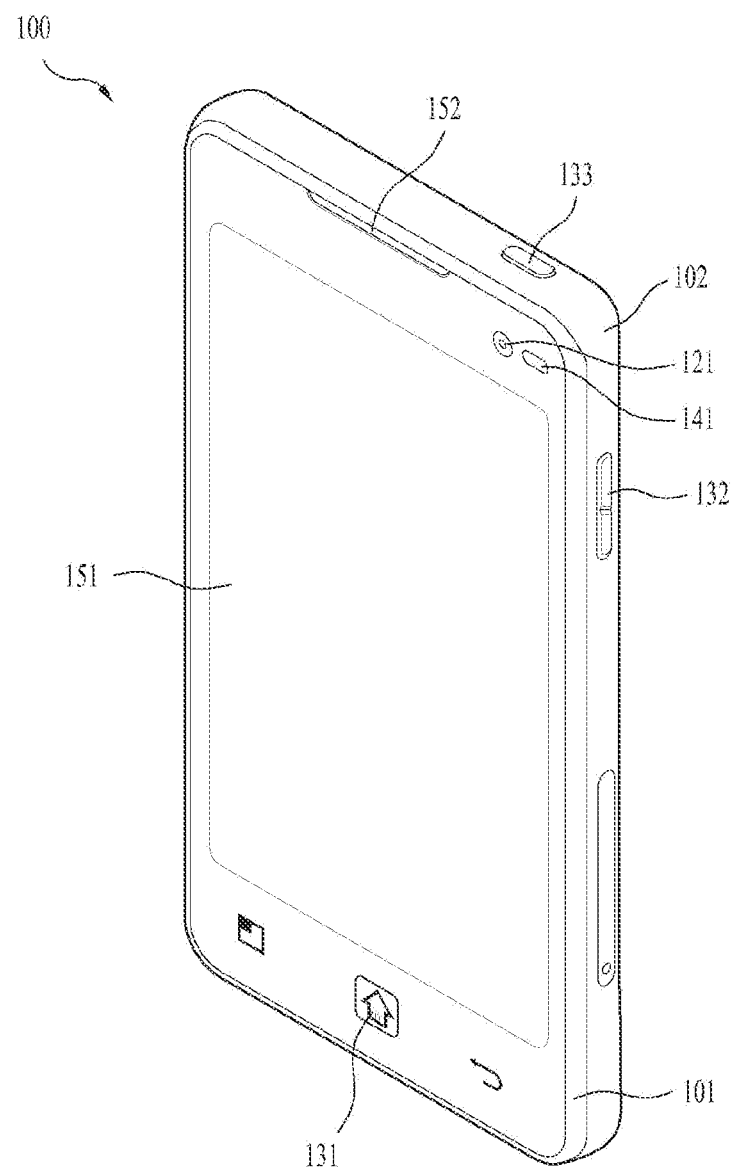
FIG. 2 is a front perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical mechanism for performing a touch, a proximity touch, a gesture and the like as a finger, a stylus pen and the like is named a pointer.

Searching and Saving an Audio Suitable for an Image in Association with the Corresponding Image According to one embodiment of the present invention, a mobile terminal capable of saving an audio suitable for an image in association with the corresponding image in accordance with a determination made by a controller or a user's selection and a method of controlling the mobile terminal are provided. In this instance, if the audio is saved in association with the image, the saved audio can be played together with the image when displaying the corresponding image. In the present specification, for clarity, the audio saving process in association with the image is named 'synthesizing the audio with the image'.

Figure 3:
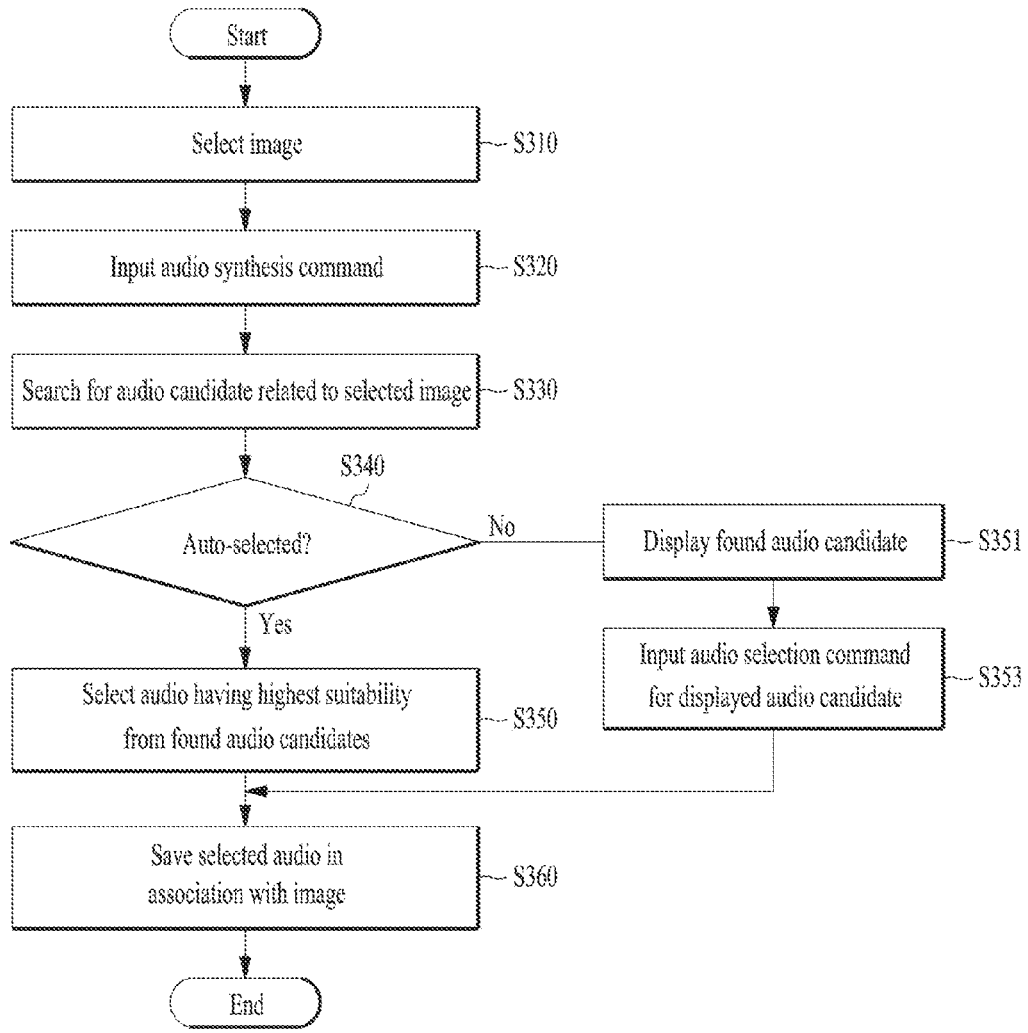
FIG. 3 is a flowchart illustrating one example of a process for saving an audio suitable for an image in association with the corresponding image in accordance with a determination made by a controller or a user's selection in a mobile terminal according to one embodiment of the present invention.

FIG. 3 is a flowchart illustrating one example of a process for saving an audio suitable for an image in association with the corresponding image in accordance with a determination made by a controller or a user's selection in a mobile terminal according to one embodiment of the present invention. Referring to FIG. 3, an image is selected that will be saved and matched to an audio (S310).

In this instance, the image may include an image captured through the camera 121. In addition, the image may include an image in a gallery application by being previously saved in the memory 160. In particular, if an image is selected, the corresponding image is displayed on the touchscreen through an application that provides a function of saving the image in association with an audio according to an embodiment of the present invention.

While the image is selected, an audio synthesis command can be input through the touchscreen 151 or the user input unit 130 (S320). The audio synthesis command may be input corresponding to the selected image or specifying at least one object in the selected image. Moreover, depending on a type of the audio synthesis command, an audio to be saved in association can be selected automatically by the controller 180 or selected directly by a user. For instance, when an icon corresponding to an audio synthesis command is selected by a user through a first pattern touch (e.g., a simple touch), the controller 180 automatically selects an audio suitable for a corresponding image. In another instance, when an icon corresponding to an audio synthesis command is selected by a user through a second pattern touch (e.g., a long touch), the user can directly select an audio suitable for a corresponding image.

As the audio synthesis command is input, the controller 180 can search for an audio candidate related to the selected image (S330). In this instance, the audio candidate can be found in the form of at least one portion of an audio source. In addition, the audio source is a multimedia content containing an audio savable in association with the selected image and can include one of a music file, a recording file, a video file and the like. Of course, it is not necessary for the audio source to exist in format of a file. In addition, the audio source of the present invention can include a streaming content as well.

In searching for audio candidates, the controller 180 can consider search conditions such as a user's pattern, a use frequency of an audio saved by being matched to a different image similar to the selected image, a tag or file name set for the selected image, a recognition result (e.g., face recognition, etc.) of an object included in an image, a created time and place of the selected image, a weather of the date in photographing the selected image, a color sense (e.g., REG ratio) of an image and the like. In this instance, the image creation timing point may be included in a header information of a corresponding file.

In addition, the image photographed place can be determined through a tag included in an image or a file name of an image, a GPS information included in a header and the like. Moreover, a range of the search can basically include the memory 160. If a suitable audio source is not found from the memory 160, the search range can be externally extended to an external server, Internet, SNS and the like. Moreover, in accordance with settings, the search range can be externally extended to an external server, Internet, SNS and the like.

In accordance with the settings or the type of the audio synthesis command mentioned in the foregoing description, an audio to be matched to an image among the found audio candidates may be selected automatically or by a user. If the audio is automatically selected (Yes in S340), the controller 180 selects an audio having a highest suitability to the selected image from the found audio candidates (S350) and can then save the selected audio in association with the corresponding image (S360). In this instance, the suitability to the image can be determined in accordance with a matching rate of the aforementioned search condition. In particular, as each condition is set to have a different weight, a plurality of conditions can be taken into consideration overall.

Meanwhile, if the audio is directly selected by the user (No in S340), the found audio candidate can be displayed in a prescribed shape singly or together with a prescribed image (S351). The user can determine an audio to save in association with the image from the displayed audio candidates by inputting an audio selection command (S353). Hence, the controller 180 can save the selected audio in association with the image (S360).

A process for automatically determining an audio to synthesize with an image is described with reference to FIGS. 4 to 7 as follows. For clarity, in the following drawings including FIG. 4, assume that a selection of an image to be saved in association with an audio, a display of an audio source and/or a determination of the audio source is determined through a gallery application. Yet, a function of saving an audio to correspond to an image according to an embodiment of the present invention is non-limited by the gallery application. No limitation is put on any applications capable of selecting and playing an image.

FIG. 4 is a diagram illustrating one example of automatically determining an audio to synthesize with an image in a mobile terminal according to one embodiment of the present invention. Referring to FIG. 4(*a*), an image 410 can be displayed on the touchscreen 151 through a gallery application. Further, if an audio synthesis icon 420 corresponding to an audio synthesis command is selected, the controller 180 can automatically save an audio determined as most suitable for the corresponding image 410 in association with the corresponding image 410.

If the saving operation is completed, referring to FIG. 4(*b*), the controller 180 can control an audio icon 430, which indicates that the audio is saved to correspond to the corresponding image, to be displayed. Further, if the audio icon 430 is selected, the audio saved in association with the image can be output through the audio output unit 152 while the corresponding image is displayed. In this instance, referring to FIG. 4(*c*), a progress bar 440 can be displayed on the touchscreen 151 to indicate a play status of the played audio.

Figure 5:
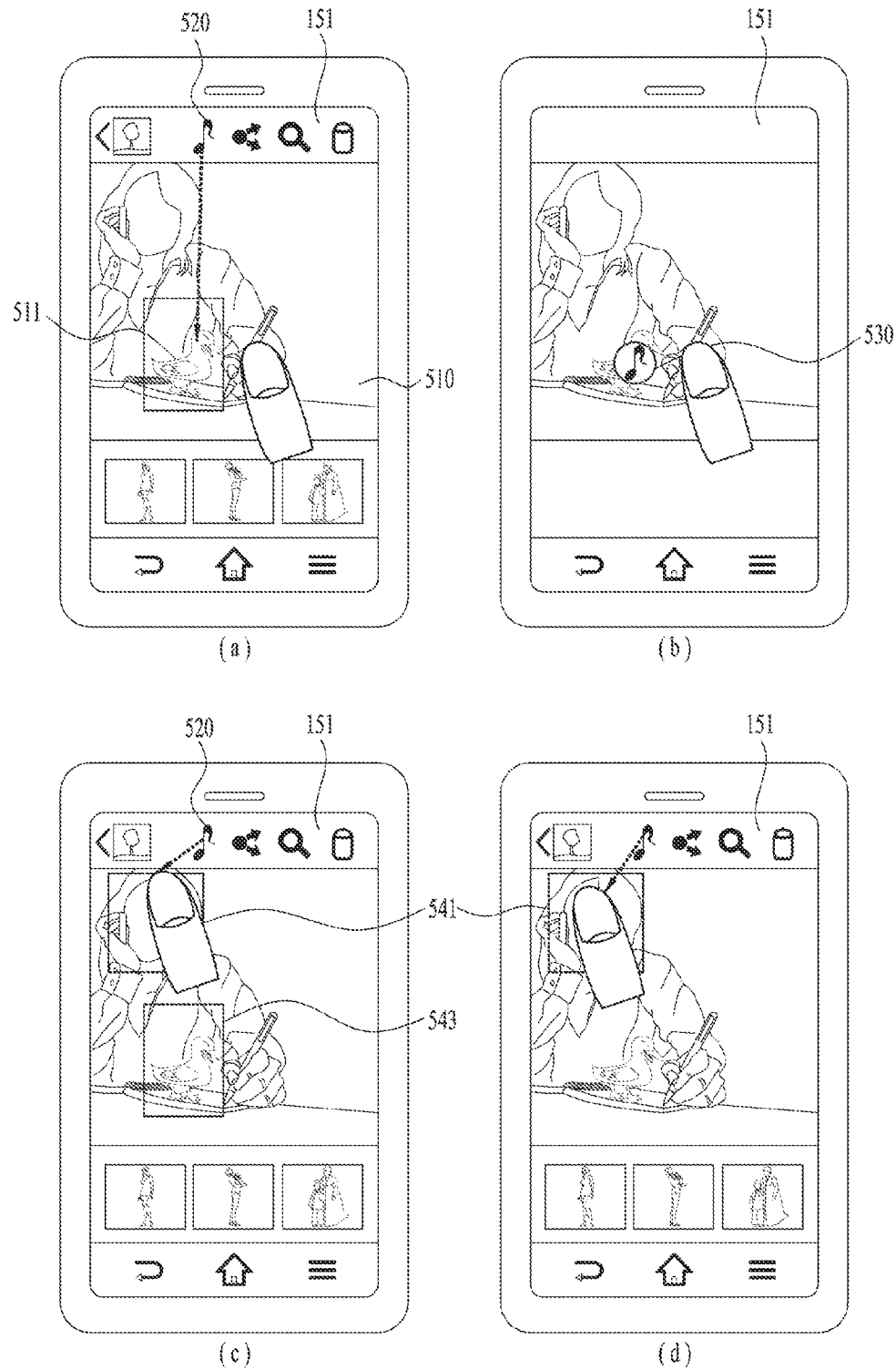
FIG. 5 is a diagram illustrating one example of automatically determining an audio to synthesize with an image in response to a selected object in a mobile terminal according to one embodiment of the present invention.

FIG. 5 is a diagram illustrating one example of automatically determining an audio to synthesize with an image in response to a selected object in a mobile terminal according to one embodiment of the present invention. Referring to FIG. 5(*a*), an image 510 can be displayed on the touchscreen 151 through a gallery application. Further, if a user drags & drops an audio synthesis icon 520 to a specific object 511 in the image 510, the controller 180 can automatically save an audio determined as most suitable for the corresponding image 510 in association with the corresponding image 510. If the saving operation is completed, referring to FIG. 5(*b*), the controller 180 can control an audio icon 530, which indicates that the audio is saved to correspond to the corresponding image, to be displayed around the selected object.

In this instance, in order to help a user's object selection, the controller 180 can inform the user of an object suitable for an audio synthesis through a prescribed visual effect. For instance, referring to FIG. 5(*c*), after the user has dragged the audio synthesis icon 520 into the image, if the user maintains the touched state, the controller 180 can control a visual effect to be displayed in advance on each of the objects 541 and 543 suitable for the audio synthesis. In this instance, the audio synthesis suitable object may preferably include an object (e.g., a face available for face recognition, a thing capable of specifying a name through shape recognition, etc.) capable of specifying a condition for searching for an audio suitable for the synthesis in accordance with a shape and color of the corresponding object.

If a pointer closely approaches one of the objects determined by the controller 180, referring to FIG. 5(*d*), the controller 180 can only display the visual effect corresponding to the object 541 most closely approached by the pointer. Thereafter, if the touch input with the pointer is released from the corresponding object, as mentioned in the foregoing description, an audio determined most suitable for the corresponding object by the controller 180 can be saved to correspond to the corresponding image. If the touch state with the pointer is released from a location failing to correspond to any visual effects, the controller 180 can control an audio to be saved by being matched to all objects determined by the controller 180.

Figure 6:
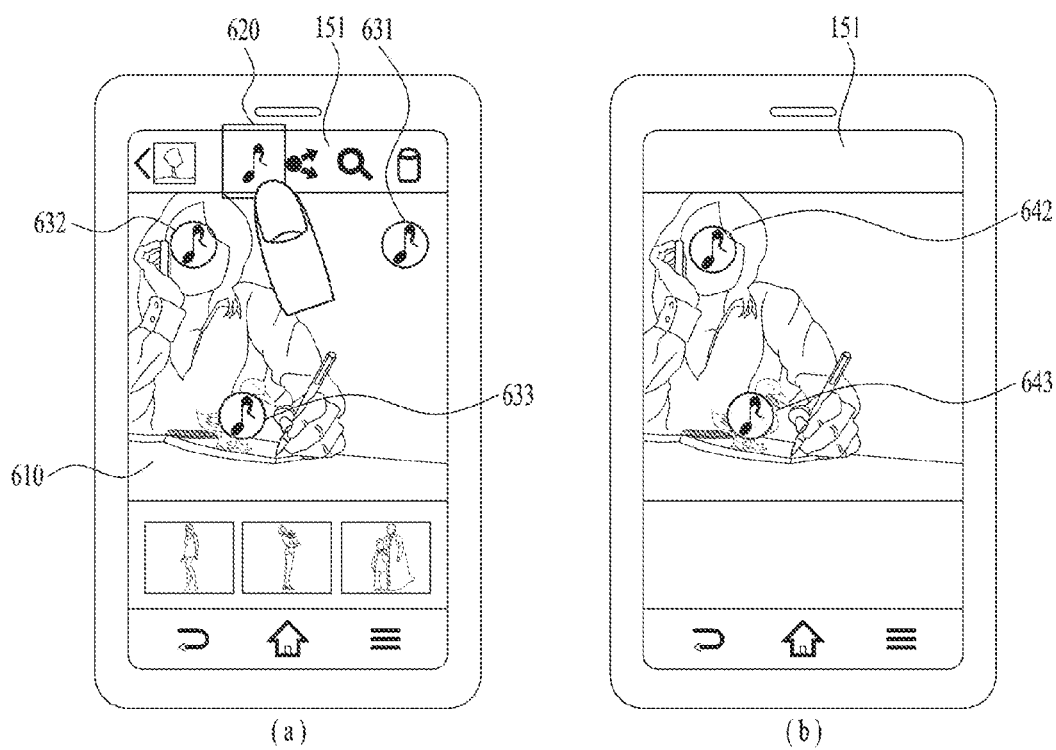
FIG. 6 is a diagram illustrating one example of automatically determining an audio to synthesize with an image in response to a plurality of objects selected from object candidates in a mobile terminal according to one embodiment of the present invention.

FIG. 6 is a diagram illustrating one example of automatically determining an audio to synthesize with an image in response to a plurality of objects selected from object candidates in a mobile terminal according to one embodiment of the present invention. Referring to FIG. 6(*a*), when an image 610 to be saved by having an audio correspond thereto is displayed, if an audio synthesis icon 620 is touched plural times in a predetermined time or long-touched, the controller 180 can control a visual effect to be displayed in advance on each of objects 631 to 633 suitable for audio synthesis. Further, if a user sequentially selects the second object 632 and the third object 633, audios most suitable for the selected objects 632 and 633 can be saved by being matched thereto, respectively. Thereafter, referring to FIG. 6(*b*), audio icons 642 and 643 can be displayed at locations corresponding to the selected objects, respectively.

Figure 7:
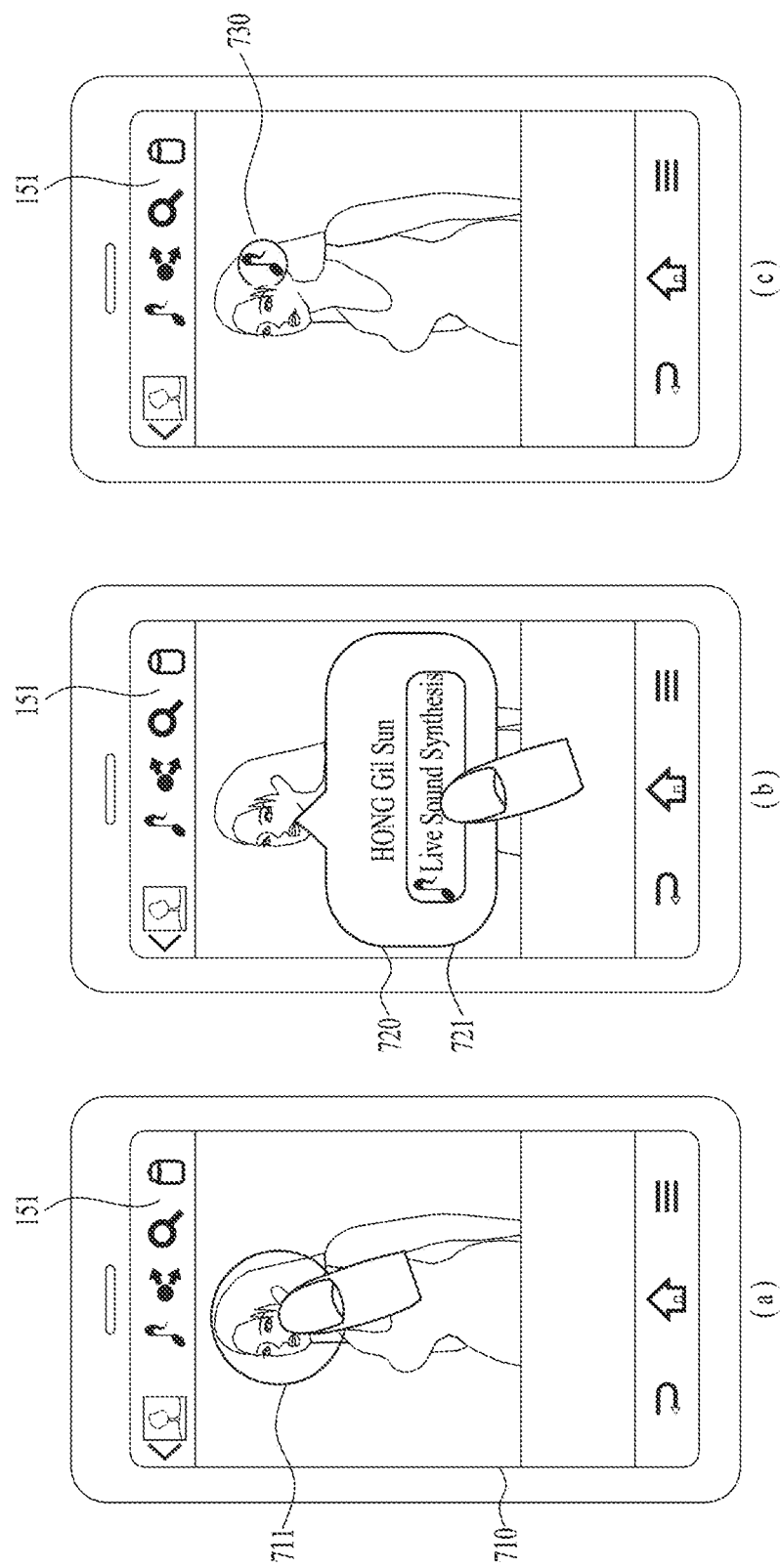
FIG. 7 is a diagram illustrating one example of automatically determining an audio to synthesize with an image in accordance with face recognition in a mobile terminal according to one embodiment of the present invention.

FIG. 7 is a diagram illustrating one example of automatically determining an audio to synthesize with an image in accordance with face recognition in a mobile terminal according to one embodiment of the present invention. Referring to FIG. 7(*a*), an image 710 including a face of a person can be displayed on the touchscreen 151 through a gallery application. Further, if a user selects a region 711 corresponding to the face, the controller 180 performs face recognition on the corresponding face and can then search the memory 160 for an audio corresponding to the person recognized as a result of the face recognition.

Hence, referring to FIG. 7(*b*) a popup menu 720 can be displayed. In the popup menu 720, a name of the recognized character (person) and a synthesis command menu 721 can be included. Further, if the user selects the synthesis command menu 721, the controller 180 can automatically save an audio, which is determined as most suitable for the corresponding face 711, in association with the corresponding image. If the saving operation is completed, referring to FIG. 7(*c*), the controller 180 can control an audio icon 730, which indicates that the audio is saved to correspond to the corresponding image, to be displayed around the face.

A process for determining an audio to synthesize with an image in response to a user's selection is described in detail with reference to FIGS. 8 to 16 as follows. For clarity, in the following drawings including FIG. 8, assume that an audio source includes at least one video.

Figure 8:
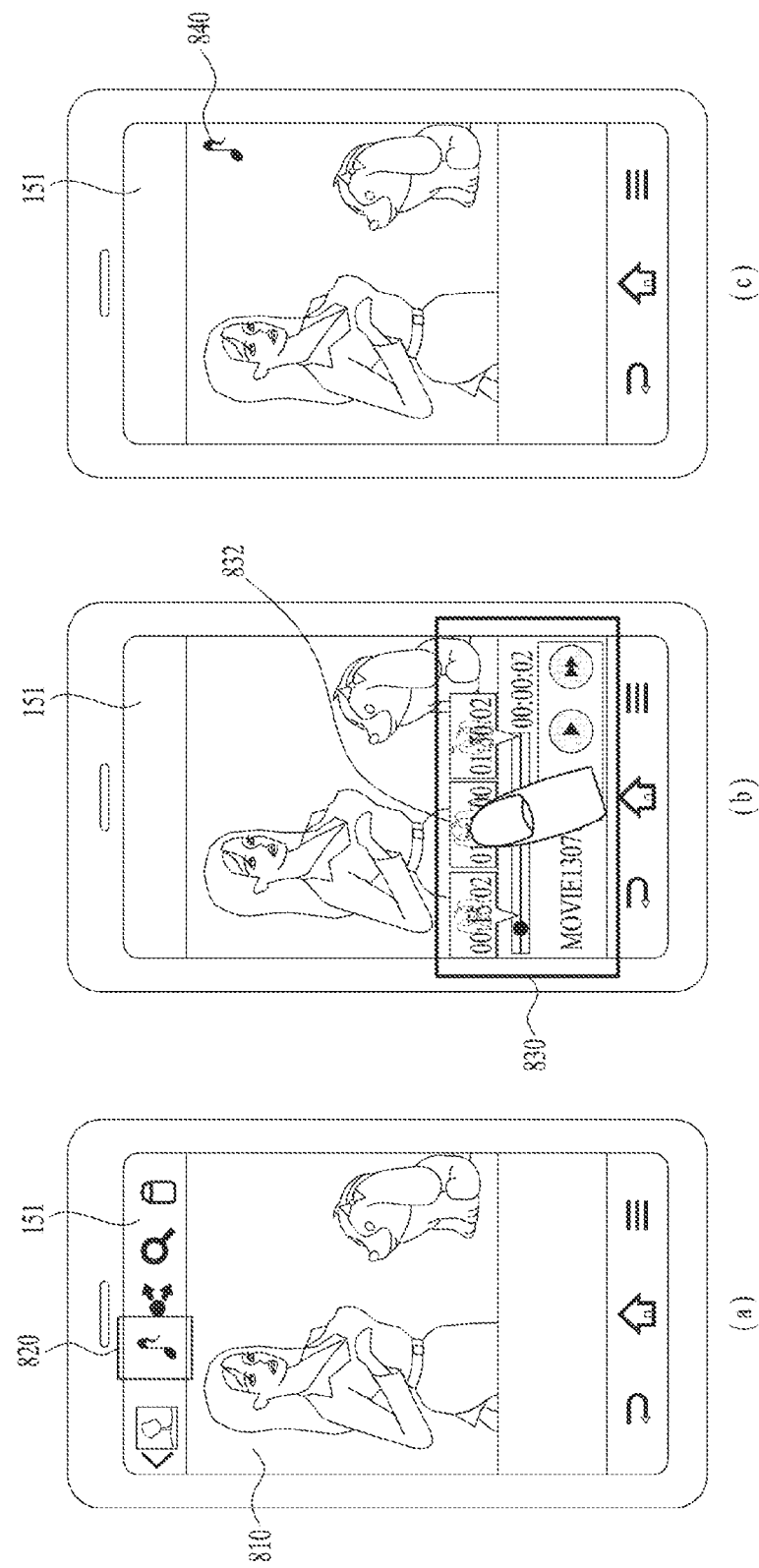
FIG. 8 is a diagram illustrating one example of a process for a user to determine an audio to synthesize with an image in a mobile terminal according to one embodiment of the present invention.

FIG. 8 is a diagram illustrating one example of a process for a user to determine an audio to synthesize with an image in a mobile terminal according to one embodiment of the present invention. Referring to FIG. 8(*a*), an image 810 can be displayed on the touchscreen 151 through a gallery application. Further, if an audio synthesis icon 820 corresponding to an audio synthesis command is selected, the controller 180 searches for audio candidate(s) related to the corresponding image 810 and can then display a corresponding result.

As a result of the search, if three parts included in a single video are found as the audio candidates, referring to FIG. 8(*b*), a source information 830 can be displayed on a bottom region. In this instance, the source information 830 may include a name of a corresponding source, a menu collection (e.g., a progress bar, a play button, a pause button, etc.) for changing a play status, and thumbnails corresponding to the related parts. In this instance, each of the thumbnails may include an I frame corresponding to a timing point at which the corresponding audio candidate is included in a source video containing the audio candidates.

In this instance, if a user selects the middle thumbnail 832, the controller 180 can control an audio, which corresponds to the thumbnail selected from the source video, to be saved in association with the corresponding image. If the saving operation is completed, referring to FIG. 8(*c*), the controller 180 can display an audio icon 840 indicating that the audio is saved for the corresponding image. Further, if the audio icon 840 is selected, as mentioned in the foregoing description, the saved audio can be output through the audio output unit 152 while the corresponding image is displayed.

Figure 9:
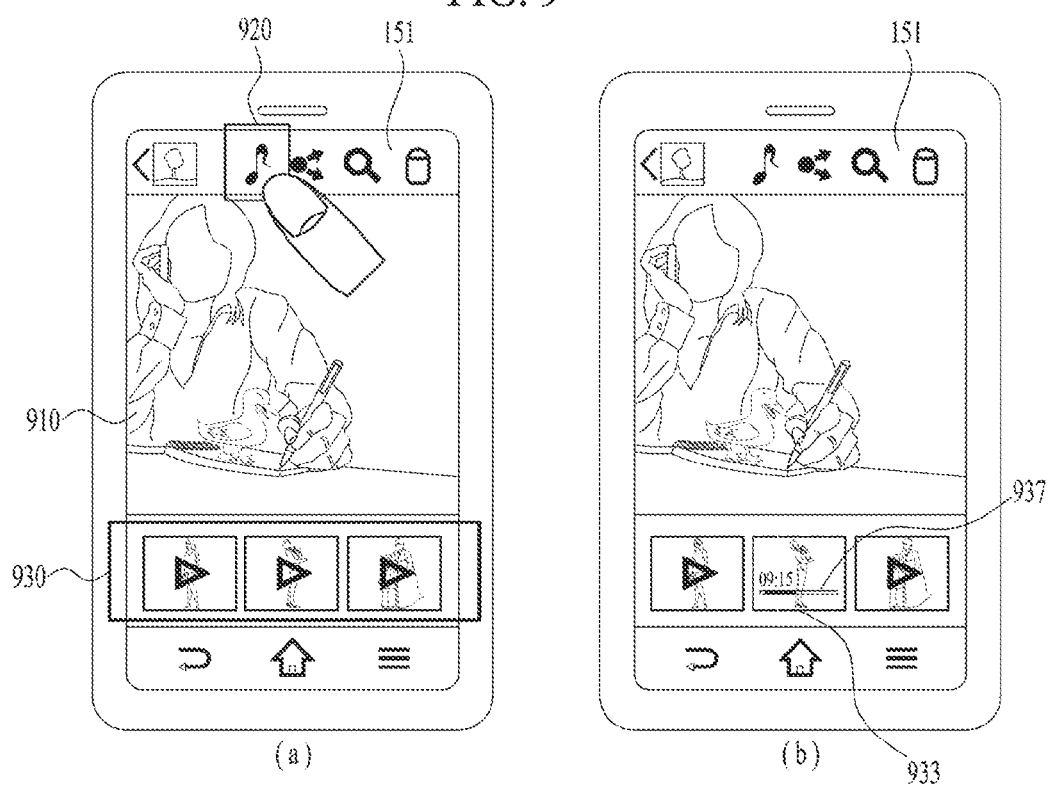
FIG. 9 is a diagram illustrating one example of a process for a user to determine an audio to synthesize with an image when finding a plurality of audio sources in a mobile terminal according to one embodiment of the present invention.

FIG. 9 is a diagram illustrating one example of a process for a user to determine an audio to synthesize with an image when finding a plurality of audio sources in a mobile terminal according to one embodiment of the present invention. Referring to FIG. 9(*a*), an image 910 can be displayed on the touchscreen 151 through a gallery application. Further, if an audio synthesis icon 920 corresponding to an audio synthesis command is selected, the controller 180 searches for audio source(s) related to the corresponding image 910 and can then display a corresponding result. As a result of the search, if four videos respectively included in different videos are found as audio candidates, an audio candidate information 930 can be displayed.

In the audio candidate information 930, a thumbnail and play button of the video containing each of the audios can be included. Further, if a user selects the play button of the third thumbnail 933, referring to FIG. 9(*b*), a progress bar 937 is displayed within the corresponding thumbnail and a part related to the image in the corresponding video can be played. Of course, it may be able to play the audio only instead of playing the video. In order to select a prescribed audio from the audio candidate information 930, a user selects a region other than the play button from each of the thumbnails or may drag & drop the corresponding thumbnail to a region having the image 910 displayed thereon.

Figure 10:
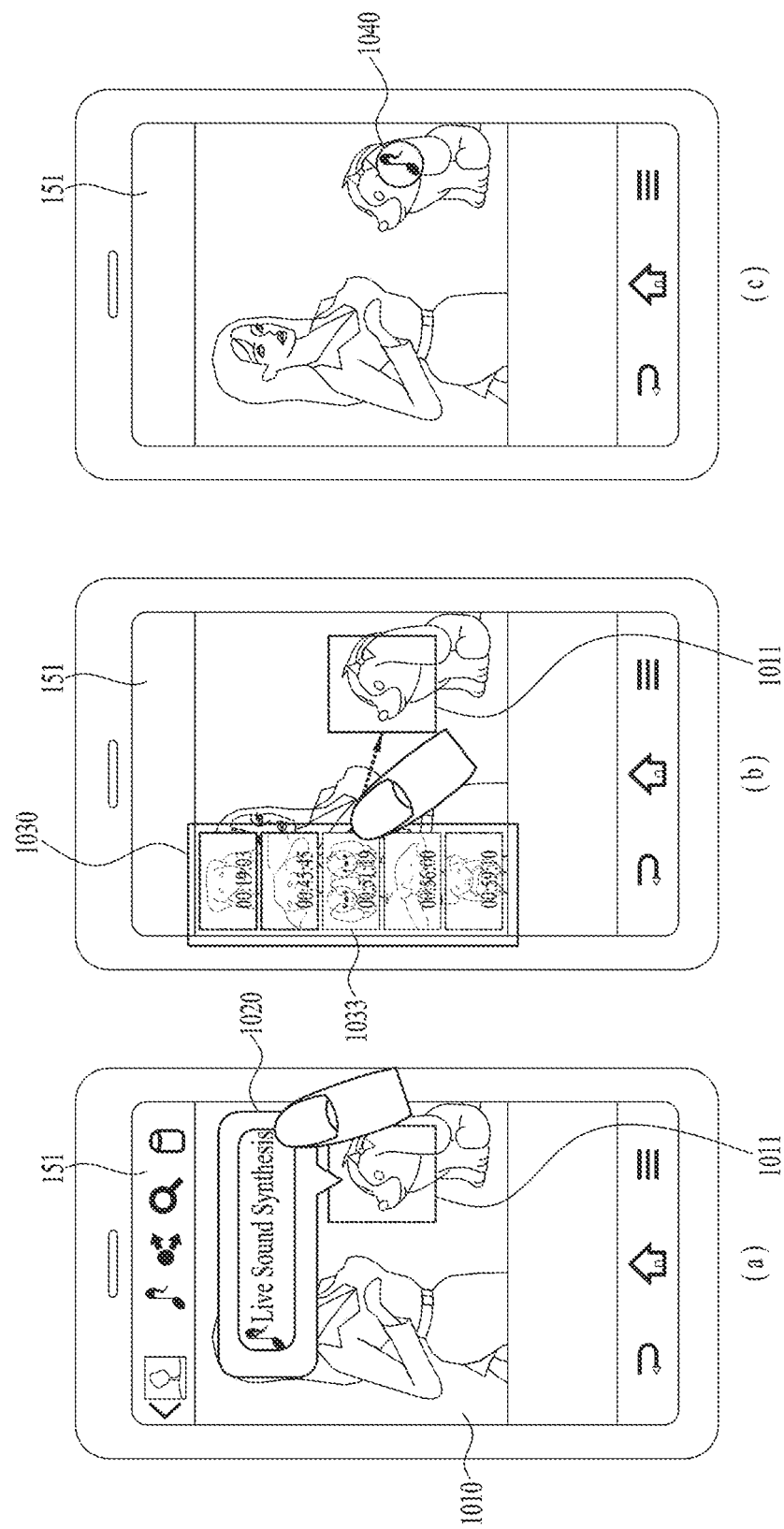
FIG. 10 is a diagram illustrating one example of a process for selecting an audio when finding a plurality of audio sources to be synthesized with a specific object of an image in a mobile terminal according to one embodiment of the present invention.

FIG. 10 is a diagram illustrating one example of a process for selecting an audio when finding a plurality of audio sources to be synthesized with a specific object of an image in a mobile terminal according to one embodiment of the present invention. Referring to FIG. 10(*a*), an image 1010 can be displayed on the touchscreen 151 through a gallery application. Further, if a user selects a specific object 1011 in the image, an audio synthesis menu 1020 for the selected object 1011 can be displayed. Further, if the audio synthesis menu 1020 is selected, the controller 180 searches for audio candidate(s) related to the corresponding object 1011 and can then display a corresponding result. If the search operation is completed, referring to FIG. 10(*b*), an audio candidate information 1030 can be displayed on a left side end of the image.

In particular, when audios of five parts are found from three different videos, a thumbnail corresponding to each of the five parts and a timing information of each of the corresponding parts in a corresponding source video can be displayed on the audio candidate information 1030. In this instance, the audio included in the same video can inform a user of a presence or non-presence of identity of a corresponding source by representing the periphery of the corresponding thumbnail in the same color. Further, if the third thumbnail 1033 is selected, the controller 180 can save the audio corresponding to the selected thumbnail in association with the corresponding image. If the saving operation is completed, referring to FIG. 10(*c*), the controller 180 can display an audio icon 1040 indicating that the audio is saved for the object 1011.

Figure 11:
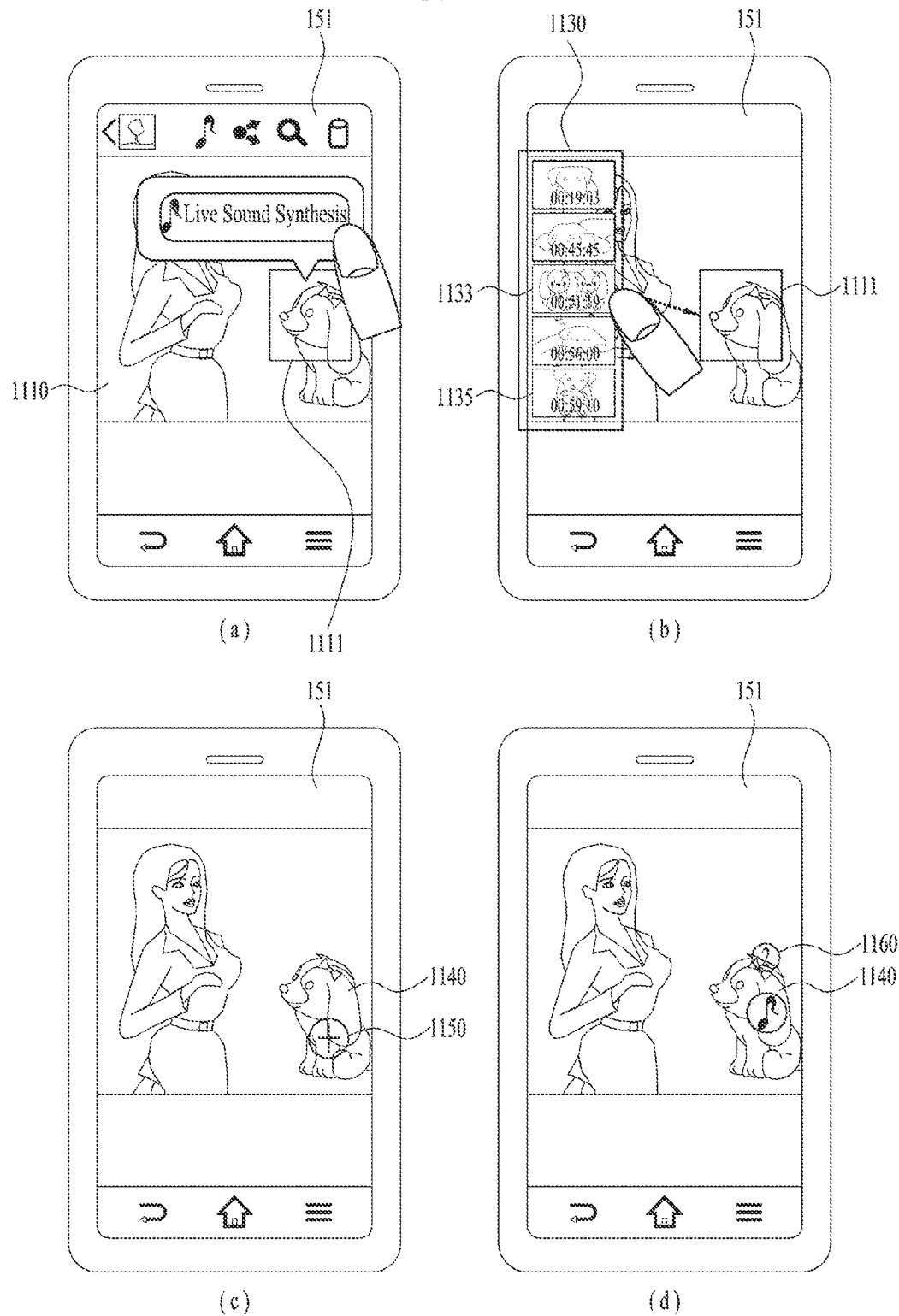
FIG. 11 is a diagram illustrating one example of a process for selecting a plurality of audios when finding a plurality of audio candidates to be synthesized with a specific object of an image in a mobile terminal according to one embodiment of the present invention.

FIG. 11 is a diagram illustrating one example of a process for selecting a plurality of audios when finding a plurality of audio candidates to be synthesized with a specific object of an image in a mobile terminal according to one embodiment of the present invention. Referring to FIG. 11(*a*), an image 1110 can be displayed on the touchscreen 151 through a gallery application. Further, if a user selects a specific object 1111 in the image 1110, an audio synthesis menu 1120 for the selected object 1111 can be displayed.

Further, if the audio synthesis menu 1120 is selected, the controller 180 searches for audio candidate(s) related to the corresponding object 1111 and can then display a corresponding result. If the search operation is completed, referring to FIG. 11(b), an audio candidate information 1130 can be displayed on a left side end of the image. Further, if the third thumbnail 1133 is dragged to the selected object 1111, the controller 180 can save the audio corresponding to the selected thumbnail in association with the corresponding image. If the saving operation is completed, referring to FIG. 11(c), the controller 180 can display an audio icon 1140 indicating that the audio is saved by corresponding to the object 1111. In this instance, if a plurality of audios can be saved for a single object, an audio addition icon 1150 can be displayed.

If the audio addition icon 1150 is selected, as shown in FIG. 11(b), an audio candidate information 1130 can be displayed. In this instance, if the fifth thumbnail 1135 is selected, the controller 180 can additionally save the audio corresponding to the fifth thumbnail 1135 in association with the corresponding image. Hence, referring to FIG. 11(d), a visual effect 1160 corresponding to the number of the audios saved in association can be additionally displayed on the audio icon 1140. Further, the audio addition icon 1150 may be displayed for predetermined duration only after completion of the first audio selection, or may continue to be displayed.

Figure 12:
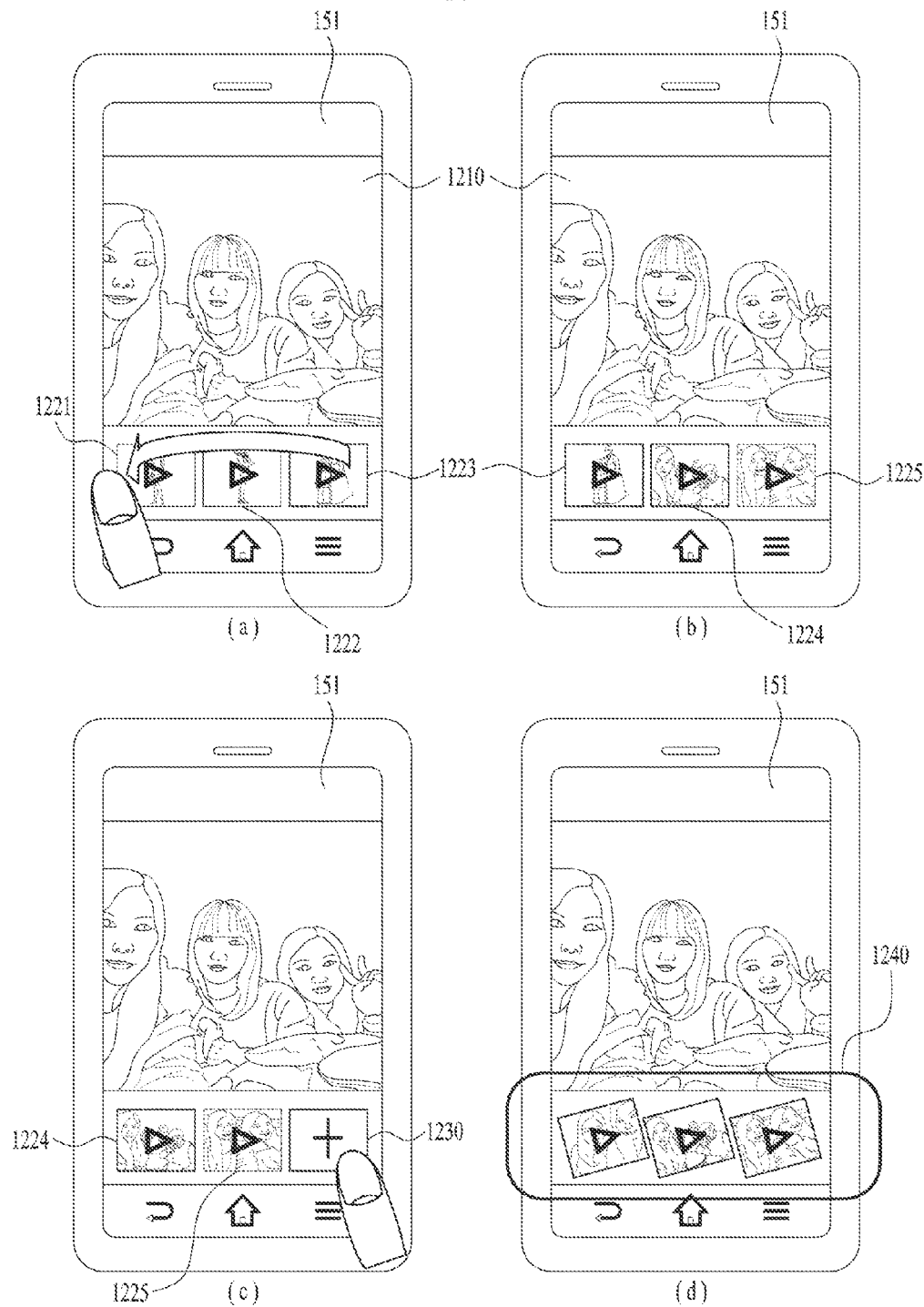
FIG. 12 is a diagram illustrating one example of a method of discovering a found audio after finding a plurality of audio candidates to be synthesized with an image in a mobile terminal according to one embodiment of the present invention.

FIG. 12 is a diagram illustrating one example of a method of discovering a found audio after finding a plurality of audio candidates to be synthesized with an image in a mobile terminal according to one embodiment of the present invention. Referring to FIG. 12(a), as an audio synthesis command for a selected image 1210 is input, the controller 180 searches for a plurality of audio candidates related to the corresponding image and can then control three thumbnails, which correspond to a part containing an audio found from a video containing each of the audio candidates, to be displayed on a bottom part of the image 1210.

According to the example shown in FIG. 12(a), thumbnails 1221 to 1223 corresponding to three audios, which are determined as having highest suitability by the controller 180, are displayed in the first place. Further, if a user intends to check other audio candidates, the user can input a flicking touch in a left direction from a right side to the region on which the thumbnails are displayed. Hence, referring to FIG. 12(b), as the thumbnails are scrolled, the thumbnail corresponding to the fourth audio and the thumbnail 1225 corresponding to the fifth audio can be displayed. Further, if a flicking touch is input again, the thumbnails can be scrolled in a left direction again.

Yet, if the number of the audio candidates found by the controller 180 or the number of the audio candidates successfully passing a preset suitability level is just 5, referring to FIG. 12(c), a candidate addition icon 1230 can be displayed next to the last thumbnail. If the candidate addition icon 1230 is selected, the controller 180 additionally searches for audio candidate(s) having suitability lower than that of the first five audio candidates or extends a search range. Subsequently, referring to FIG. 12(d), the controller 180 can display thumbnails 1240 respectively corresponding to new audio candidates.

FIG. 13 is a diagram illustrating another example of a method of discovering a found audio after finding a plurality of audio candidates to be synthesized with an image in a mobile terminal according to one embodiment of the present invention. Referring to FIG. 13, the following assumption similar to that of FIG. 12 is made. First of all, as an audio synthesis command for a selected image is input, the controller 180 searches for a plurality of audio candidates related to the corresponding image and can then control three thumbnails, which correspond to a part containing an audio found from a video containing each of the audio candidates, to be displayed on a bottom part of the image.

In this instance, referring to FIG. 13(a), as a play button included in a first thumbnail displayed region 1310 is selected, a part containing a first audio candidate in a source video can be played within the corresponding region 1310. Hence, a progress bar 1311 can be displayed as well. Further, if a user inputs a flicking touch to the image in a left direction, a play timing point of a video can be changed. Hence, referring to FIG. 13(b), a play timing point indicated by a progress bar 1311' is changed as well. If the user inputs a flicking touch to the image in a top direction again, referring to FIG. 13(c), a video containing a next audio candidate can be played in a region on which a thumbnail corresponding to the next audio candidate is displayed. Hence, a progress bar 1321 can be displayed as well. If the user inputs a flicking touch to the image in a bottom direction again, the video containing the first audio candidate can be played. If the user inputs a flicking touch to the image in a top direction, a video corresponding to a third audio candidate can be played in a region 1330 on which a thumbnail corresponding to the third audio candidate is displayed.

In brief, by a flicking touch input to an image in a width direction, a play timing point of a video containing a currently played audio candidate can be changed. By a flicking touch in a length direction, a currently played audio candidate can be changed into a previous audio candidate or a next audio candidate.

Figure 14B:
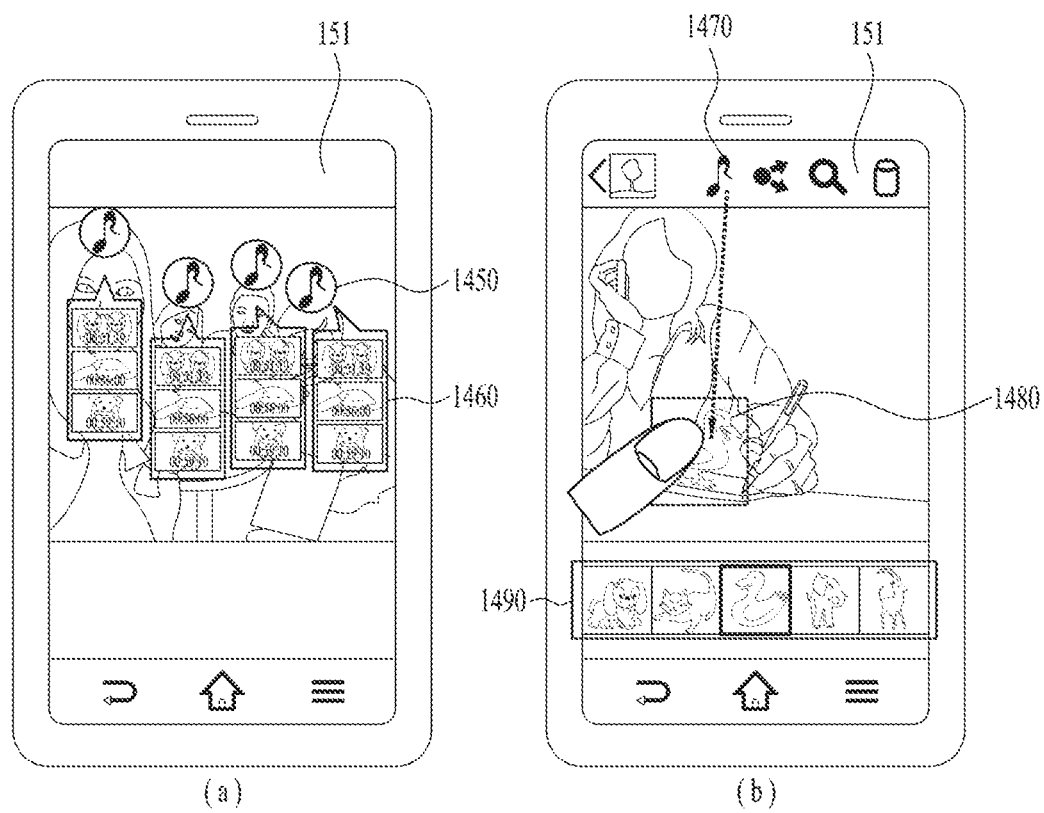

In the following description, a method for a user to select an audio candidate in accordance with a face recognition result is explained with reference to FIGS. 14A to 15. FIG. 14A and FIG. 14B are diagrams illustrating one example of selecting a prescribed one of audio candidates found by face recognition in a mobile terminal according to one embodiment of the present invention.

Referring to FIG. 14A (a), an image 1410 including a face of a person can be displayed on the touchscreen 151 through a gallery application. If a user selects a region 1420 corresponding to the face, the controller 180 performs a face recognition on the corresponding face and can then search the memory 160 for an audio corresponding to the recognized person as a result of the face recognition. Hence, a popup menu 1420 can be displayed. In this instance, a name of the recognized person or character and a synthesis command menu can be included in the popup menu 1420.

Further, if the user selects the synthesis command menu, referring to FIG. 14A (b), the controller 180 can display a list 1430 of audio candidates suitable for the corresponding face 1411. In particular, a text converted from a corresponding audio candidate by STT can be displayed together with each item included in the list 1430. This method may be useful because it is highly possible that a human voice is included in the search result in accordance with the face recognition. If a prescribed audio is selected from the list 1430, the controller 180 can save the selected audio in association with the corresponding image. If the saving operation is completed, referring to FIG. 14 (c), the controller 180 can control an audio icon 1440, which indicates that the audio is saved corresponding to the corresponding image, to be displayed around the face.

Further, referring to FIG. 14B (a), if a plurality of characters are included in a single image as a result of the face recognition, the controller 180 can control an indicator 1450, which indicates that an audio synthesis is available, and a list 1460, which includes audio candidates found for the corresponding recognized character, to be displayed around each of the recognized characters. If a user drags an audio synthesis icon 1470 not to a person but to an object 1480, as shown in FIG. 14B (b), the controller 180 recognizes the corresponding object using a relative size of the corresponding object with a shape/color/face recognized neighbor character and can control a candidate category list 1490 matching the recognition result to be output in the first place. If a prescribed one candidate category is selected from the candidate category list 1490, the controller 180 can search for audio candidate 9s) using the selected category as a search condition.

FIG. 15 is a diagram illustrating one example of discovering a source of an audio candidate found by face recognition in a mobile terminal according to one embodiment of the present invention. Referring to FIG. 15(*a*), when an image 1510 is displayed on the touchscreen 151, if a face 1511 of a specific character is selected, an audio candidate search through a face recognition can be performed. When a result of the search is displayed as a thumbnail list, as shown in FIG. 15(*b*), if a user applies a long touch to a thumbnail 1521 corresponding to a first audio candidate, a video including the first audio candidate can be displayed as a full screen shown in FIG. 15(*c*). Further, a part of a selected specific character 1511' appearing in the corresponding video can be displayed as a bar 1531/1532 on a top end of progress bar 1530. If a user selects a prescribed one of the bars 1531 and 1532, referring to FIG. 15(*d*), a synthesis menu 1540 is displayed. If the synthesis menu 1540 is selected, an audio corresponding to the selected bar can be synthesized with the image 1510.

According to the embodiments mentioned in the foregoing description, a list of audio candidates is displayed in a manner that a thumbnail of an audio candidate included part is displayed. Alternatively, a list of audio candidates can be displayed as shown in FIG. 16. FIG. 16 is a diagram illustrating one example of various display methods of an audio candidate list applicable to one embodiment of the present invention and setting menus thereof.

Referring to FIG. 16(*a*), as an audio candidate list, a progress bar 1620/1630 of a source video containing an audio candidate and a thumbnail 1621/1631 corresponding to the progress bar 1620/1630 can be displayed on a bottom end of an image 1610. A part containing an audio candidate in the corresponding source video can be displayed as a bar on each of the progress bars 1620 and 1630. Referring to FIG. 16(*b*), a category list 1640 is additionally displayed. If a prescribed category is selected from the category list 1640, a thumbnail list below the category list can be changed to correspond to a list of audio candidates corresponding to the selected category.

Meanwhile, whether to turn on a display of the category list 1640 and conditions considered for a search for audio candidates can be selected through a menu shown in FIG. 16(*c*).

Figure 17:
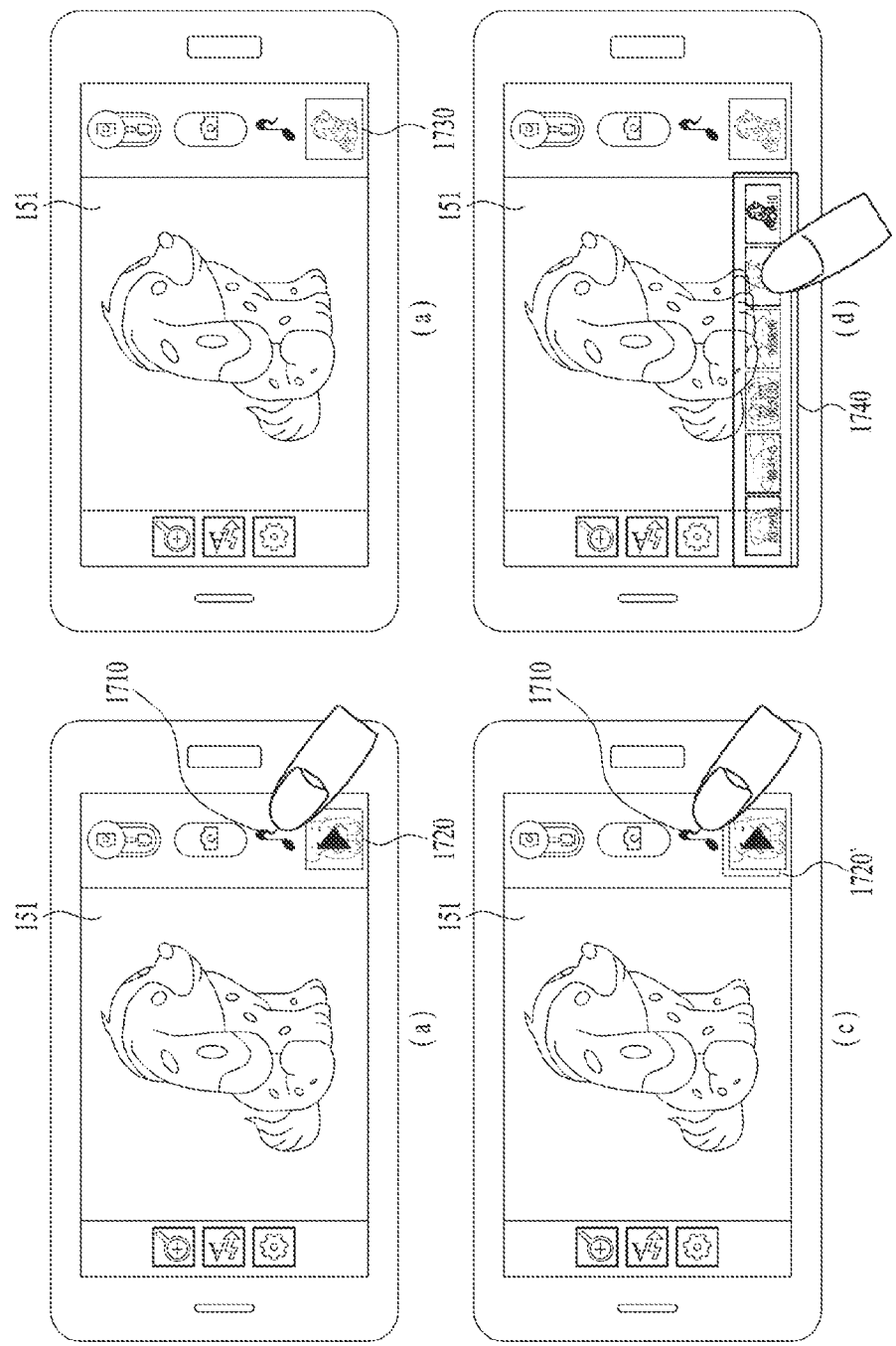
FIG. 17 is a diagram illustrating one example of a process for selecting an audio candidate to be synthesized in the course of taking an image in a mobile terminal according to one embodiment of the present invention.

In the following description, a method of selecting an audio candidate in the course of taking an image or video is explained in detail with reference to FIG. 17 and FIG. 18. FIG. 17 is a diagram illustrating one example of a process for selecting an audio candidate to be synthesized in the course of taking an image in a mobile terminal according to one embodiment of the present invention.

Referring to FIG. 17(*a*), if an image is taken in camera photographing mode, the controller 180 can search the memory 160 for a presence or non-presence of a video related the taken image in consideration of an image taken time, an image taken place, a subject of the image and the like. If the corresponding video exits as a result of the search, the controller 180 displays an audio synthesis icon 1710 and can also display a thumbnail 1720 of the found video. If the audio synthesis icon 1710 is selected, an audio most suitable for the taken image in the found video can be saved in association with the taken image. Hence, an icon 1730 indicating that the audio is synthesized with the taken image can be displayed.

Further, referring to FIG. 17(*c*), when a plurality of videos are found, a plurality of thumbnail images 1720' can be displayed. If an audio synthesis icon 1710 is selected, referring to FIG. 17(*d*), a list 1740 of audio candidates included in a plurality of the found videos can be displayed as a thumbnail list. If a prescribed thumbnail is selected from the list 1740, the controller 180 can save an audio corresponding to the selected thumbnail in association with the taken image.

According to the embodiments mentioned in the above description, after an image has been selected, an audio is selected. Alternatively, an audio is selected and an image suitable for the audio can be then selected. This is described in detail with reference to FIG. 18 as follows.

FIG. 18 is a diagram illustrating one example of a process for selecting an audio candidate to be synthesized with an audio included in a video in the course of taking the video in a mobile terminal according to one embodiment of the present invention. Referring to FIG. 18(*a*), if a video is taken in camera photographing mode, the controller 180 can search the memory 160 for a presence or non-presence of a video related the taken video in consideration of a video taken time, a video taken place, a subject of the video and the like. If the corresponding video exits as a result of the search, the controller 180 can display an audio synthesis icon 1810. If the audio synthesis icon 1810 is selected, referring to FIG. 18(*b*), a list 1820 of the found images can be displayed as a thumbnail list. If a prescribed thumbnail is selected from the list 1820, the controller 180 can save at least one portion of audio of the taken video in association with the image corresponding to the selected thumbnail.

Figure 19:
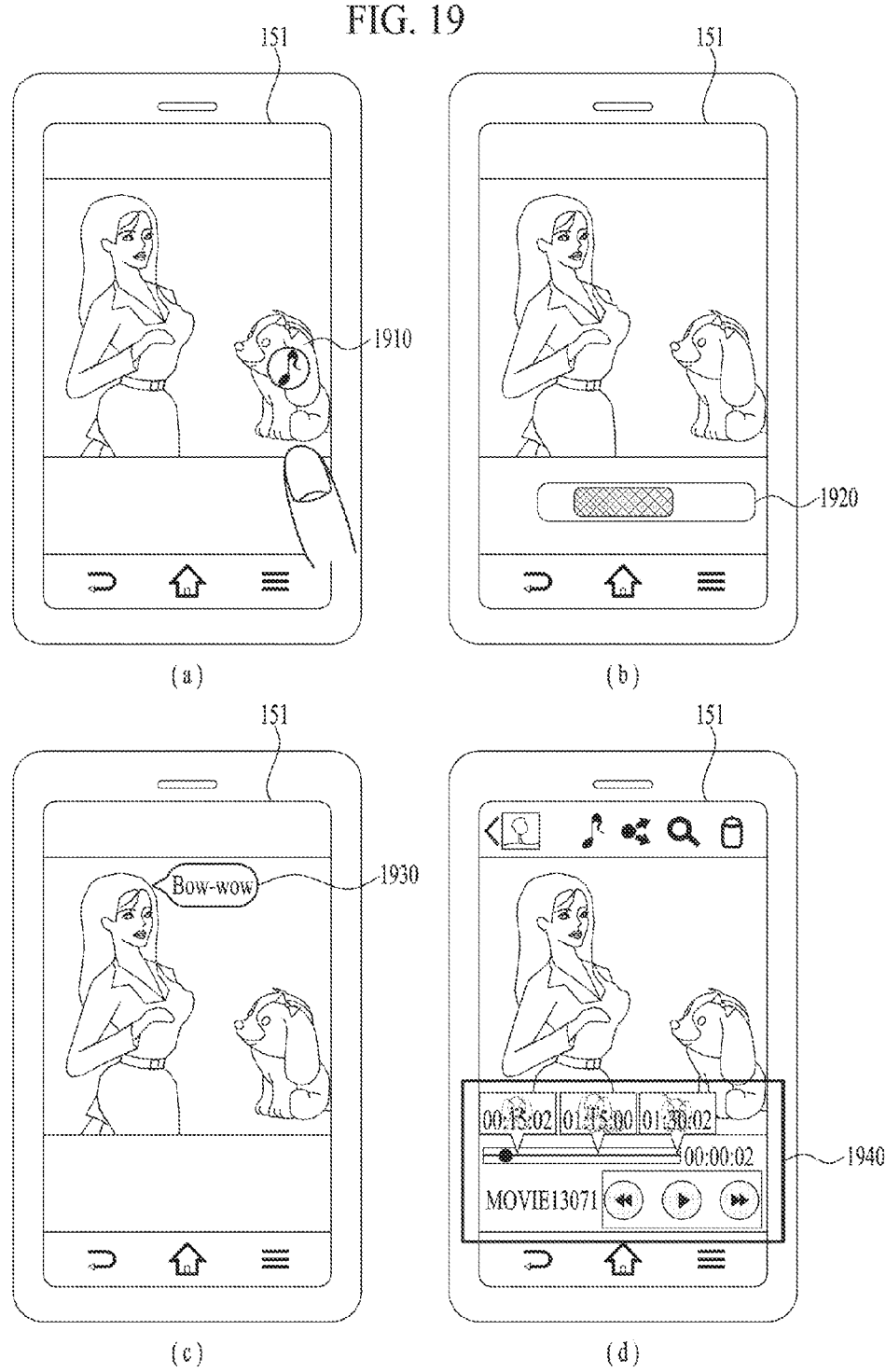
FIG. 19 is a diagram illustrating one example of a process for playing and editing an audio of a previously synthesized image in a mobile terminal according to one embodiment of the present invention.
Figure 20:
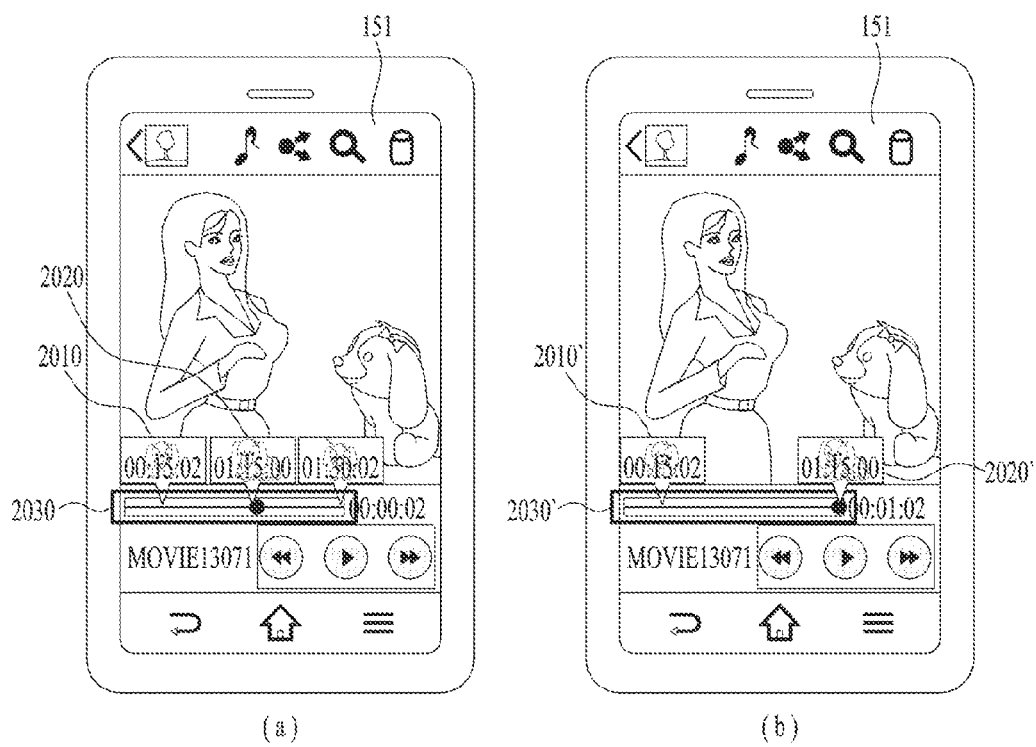
FIG. 20 is a diagram illustrating one example of an audio editing process according to one embodiment of the present invention.

A method of editing an audio saved in association with an image is described in detail with reference to FIG. 19 and FIG. 20 as follows. FIG. 19 is a diagram illustrating one example of a process for playing and editing an audio of a previously synthesized image in a mobile terminal according to one embodiment of the present invention.

Referring to FIG. 19(*a*), when an audio synthesized image is displayed on the touchscreen, an audio icon 1910 can be touched. Hence, referring to FIG. 19(*b*), an audio can be played as well as a progress bar 1920 corresponding to the synthesized audio is displayed. If the mobile terminal is in silent or vibration mode on touching the audio icon 1910, referring to FIG. 19(*c*), a text 1930 can be displayed by converting an inserted audio by STT conversion. Further, if the audio icon 1910 is long touched, referring to FIG. 19 9*d*), an editing mode can be entered. As the editing mode is entered, a source video information 1940 can be displayed on a bottom end of the image. Subsequently, a user can select another audio by selecting a thumbnail displayed on a progress bar included in the source video information 1940.

Meanwhile, for a detailed editing, a progress bar interval included in the source video information can be changed. This is described in detail with reference to FIG. 20 as follows. FIG. 20 is a diagram illustrating one example of an audio editing process according to one embodiment of the present invention.

Referring to FIG. 20(a), after the editing mode has been entered by the method mentioned in the foregoing description with reference to FIG. 19, a user applies touch inputs to two different points on an image simultaneously and can then drag the touch inputs in directions getting away from each other (i.e., pinch-out). Hence, referring to FIG. 20(b), a progress bar 2030 shown in FIG. 20(a) is extended into a progress bar 2030' so that a former distance between thumbnail images 2010 and 2020 can increase to a distance between the thumbnail images 2010' and 2020'. Through this, the user searches a source video more intensively and can then change an audio synthesized with an image by changing a location of a thumbnail image on a progress bar and then selecting the location changed thumbnail image.

In the following description, a thumbnail view mode of a gallery application according to one embodiment of the present invention is explained in detail with reference to FIGS. 21 to 24. In this instance, the thumbnail view mode means a mode in which contents included in a specific saving location or contents satisfying a specific condition are displayed as a thumbnail list.

FIG. 21 is a diagram illustrating one example of a process for displaying an image synthesized with an audio and a source video, which provides the audio to the image, in thumbnail view mode in a mobile terminal according to one embodiment of the present invention.

Referring to FIG. 21(a), thumbnails 2110, 2120, 2130 and 2140 respectively corresponding to images synthesized with audios can be displayed by being projected more than other thumbnails. The number of audios used for a synthesis can be displayed on each of the audio synthesized images. In addition, an indicator indicating an audio synthesis can be displayed on the corresponding thumbnail. In this instance, the indicator displayed on the thumbnail 2110/2120 corresponding to the image having an audio synthesized with itself may be different from that of the thumbnail 2130/2140 corresponding to the image having an audio synthesized with a specific object included in the corresponding image.

Alternatively, referring to FIG. 21(b), an image having an audio synthesized with itself and an image having an audio synthesized with an object included in the corresponding image can be displayed through a presence or non-presence of inclination as well as indicators. For videos, referring to FIG. 21(c), unlike a thumbnail 2150 corresponding to a normal video, a thumbnail 2160 can be displayed in an inclining shape. In addition, an indicator may be further given thereto to indicate that an audio is provided.

Functions of indicators are described in detail with reference to FIGS. 22 to 24 as follows. FIG. 22 is a diagram illustrating one example of a function performed through a thumbnail corresponding to an audio synthesized image in a mobile terminal according to one embodiment of the present invention.

FIG. 22(a) shows a thumbnail 2210 having an audio synthesized with an image itself according to one embodiment of the present invention. An indicator 2211 is displayed on the thumbnail 2210 to indicate that the audio is synthesized with the image itself. If a portion of the thumbnail 2210 except the indicator 2211 is selected in thumbnail view mode, referring to FIG. 22(b), an image corresponding to the thumbnail is displayed as a full screen. If the indicator 2211 is selected, referring to FIG. 22(c), the audio synthesized with the image can be played as soon as the corresponding image is displayed.

FIG. 23 is a diagram illustrating one example of a function performed through a thumbnail corresponding to a video, which provides an audio to another image, in a mobile terminal according to one embodiment of the present invention. FIG. 23(a) shows a thumbnail 2310 of a source video which provides an audio to an image according to one embodiment of the present invention. An indicator 2311 is displayed on the thumbnail 2311 to indicate that the audio is provided to the image. If a portion of the thumbnail 2310 except the indicator 2311 is selected in thumbnail view mode, referring to FIG. 23(b), a video corresponding to the thumbnail is played from the beginning. If the indicator 2311 is selected, referring to FIG. 23(c), a part including the audio provided to the image can be played.

Meanwhile, a shortcut to a source video from an image, to which an audio is provided by a corresponding video, can be performed. This is described in detail with reference to FIG. 24 and FIG. 25 as follows. FIG. 24 is a diagram illustrating one example of a process for performing a switching between a source video and an image through an indicator in a mobile terminal according to one embodiment of the present invention.

Figure 24:
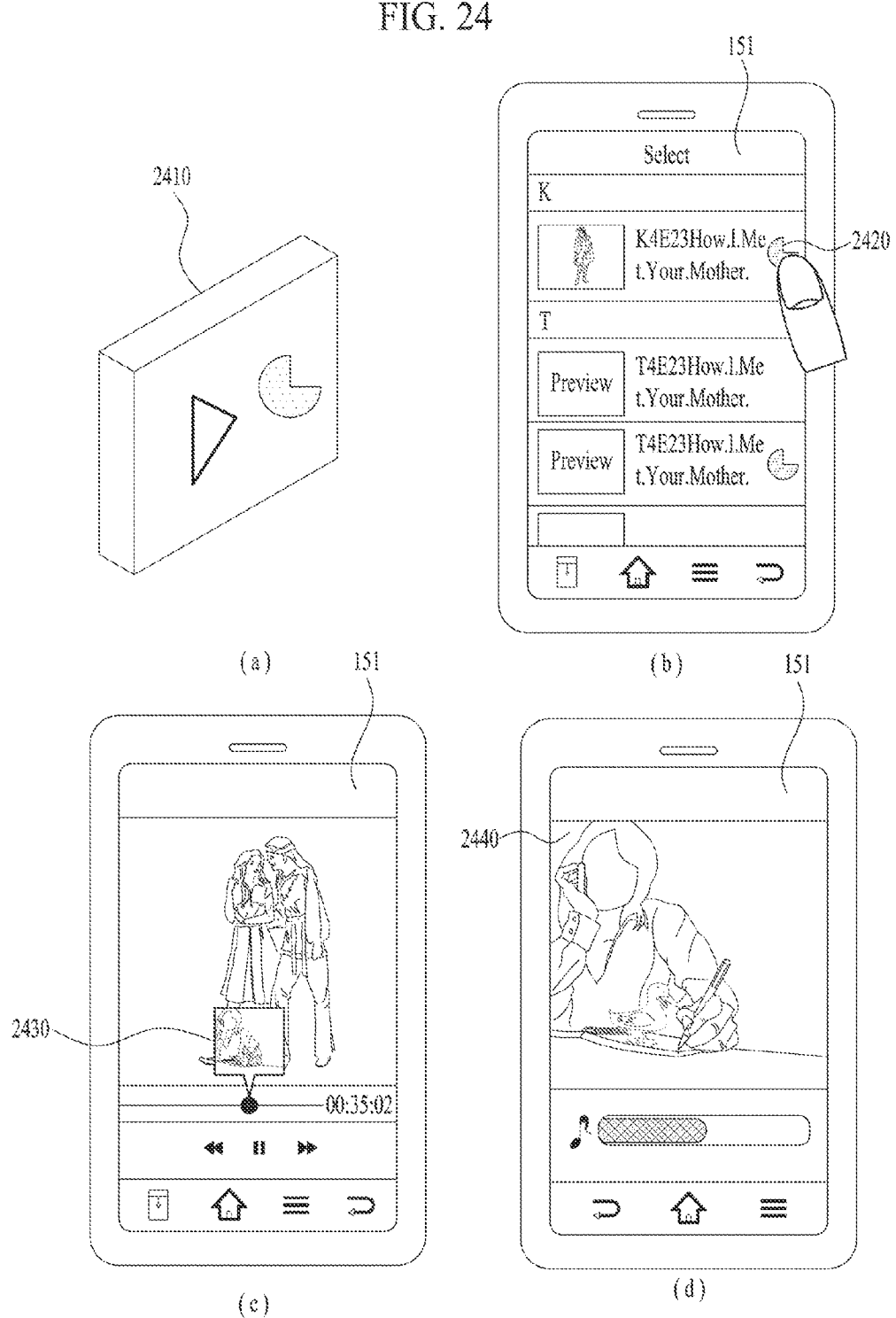
FIG. 24 is a diagram illustrating one example of a process for performing a switching between a source video and an image through an indicator in a mobile terminal according to one embodiment of the present invention.

Referring to FIG. 24, if an indicator of a thumbnail corresponding to a source video is selected in thumbnail view mode of a gallery application (FIG. 24(a)) or an indicator 2420 is selected from a video list of a video play application (FIG. 24(b)), a portion including an audio provided to an image can be played directly (FIG. 24(c)). Further, a thumbnail 2430 of the image having the audio provided thereto can be displayed on a progress bar. If the thumbnail 2430 is selected, a shortcut to the corresponding image is executed so that an image 2440 corresponding to the thumbnail 2430 can be displayed (FIG. 24(d)).

Figure 25:
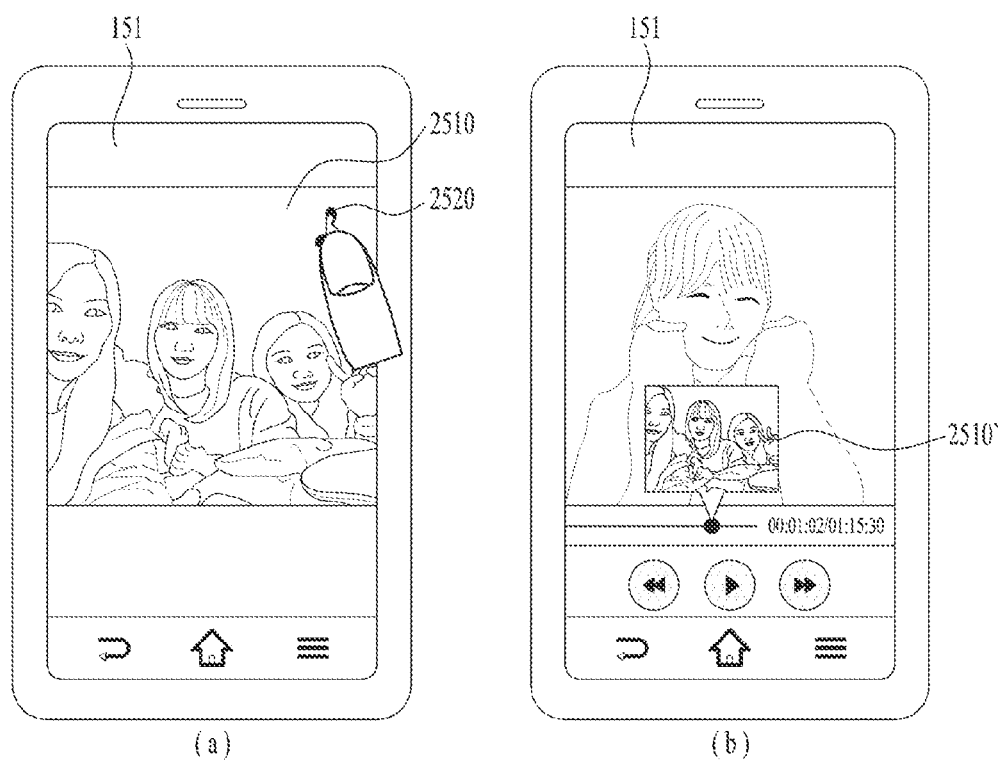
FIG. 25 is a diagram illustrating one example of a process for performing a switching between a source video and an image through an indicator in a mobile terminal according to one embodiment of the present invention.

FIG. 25 is a diagram illustrating one example of a process for performing a switching between a source video and an image through an indicator in a mobile terminal according to one embodiment of the present invention. Referring to FIG. 25(a), when an audio synthesized image 2510 is displayed, an audio icon 2520 can be selected through a touch input (e.g., touches consecutively applied twice in a prescribed time, a long touch, etc.) of which type is different from that of a touch input for audio play or editing. Hence, referring to FIG. 25(b), a play can start with a portion including an audio provided by a source video having provided the audio to the corresponding image 2510. Further, a thumbnail 2510' of the audio provided image can be displayed on a progress bar. If the thumbnail 2510' is selected, the state shown in FIG. 25 (a) can be restored.

In the following description, a method of searching an external source for an audio, with which an image will be synthesized, instead of searching the memory 160 is described in detail with reference to FIG. 26 and FIG. 27. A case of using a social network service (SNS) as an external source is described with reference to FIG. 26 and FIG. 27.

Figure 26:
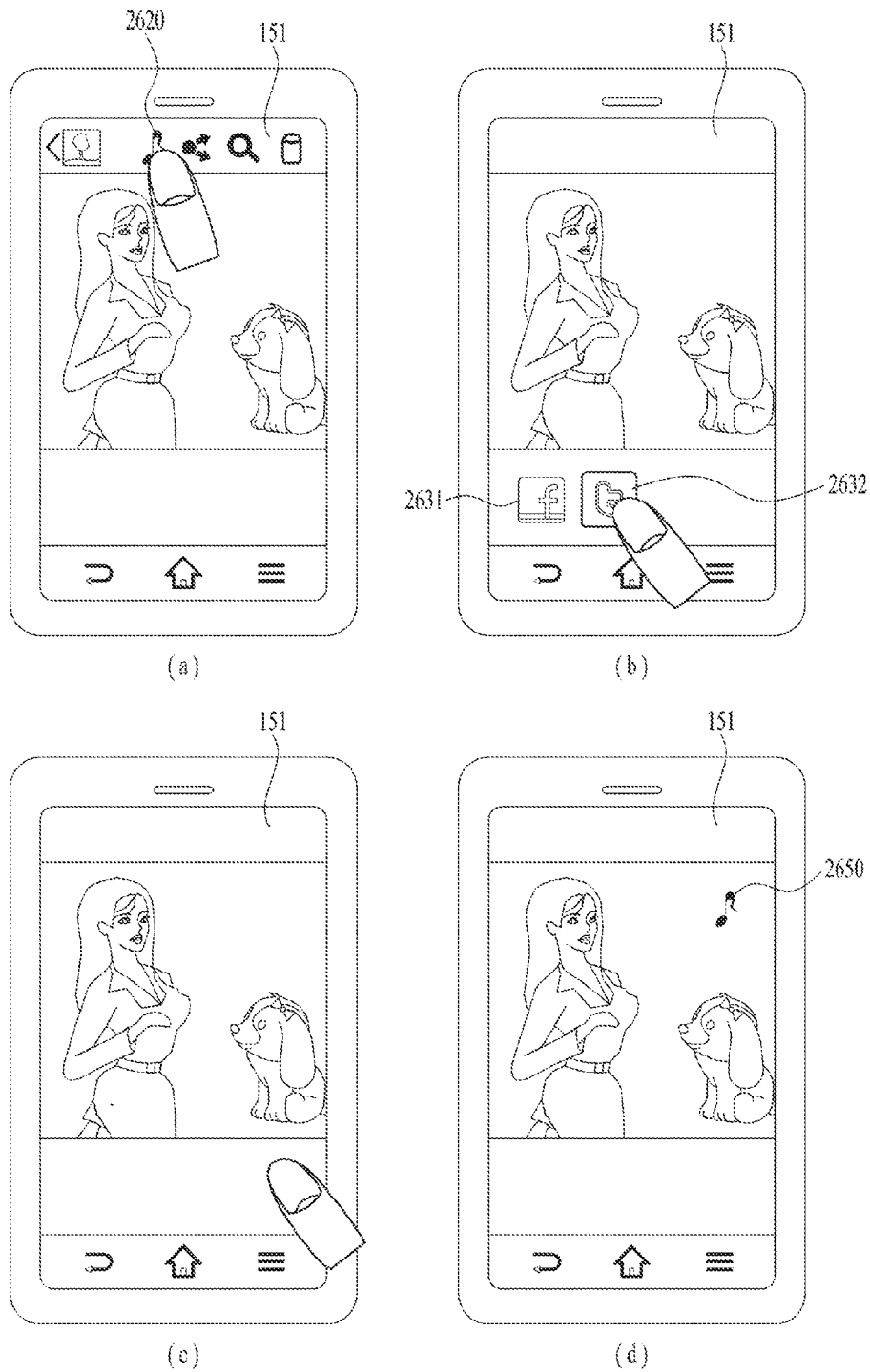
FIG. 26 and FIG. 27 are diagrams illustrating one example of a method of obtaining an audio to synthesize with an image through a social network service in a mobile terminal according to one embodiment of the present invention.
Figure 27:
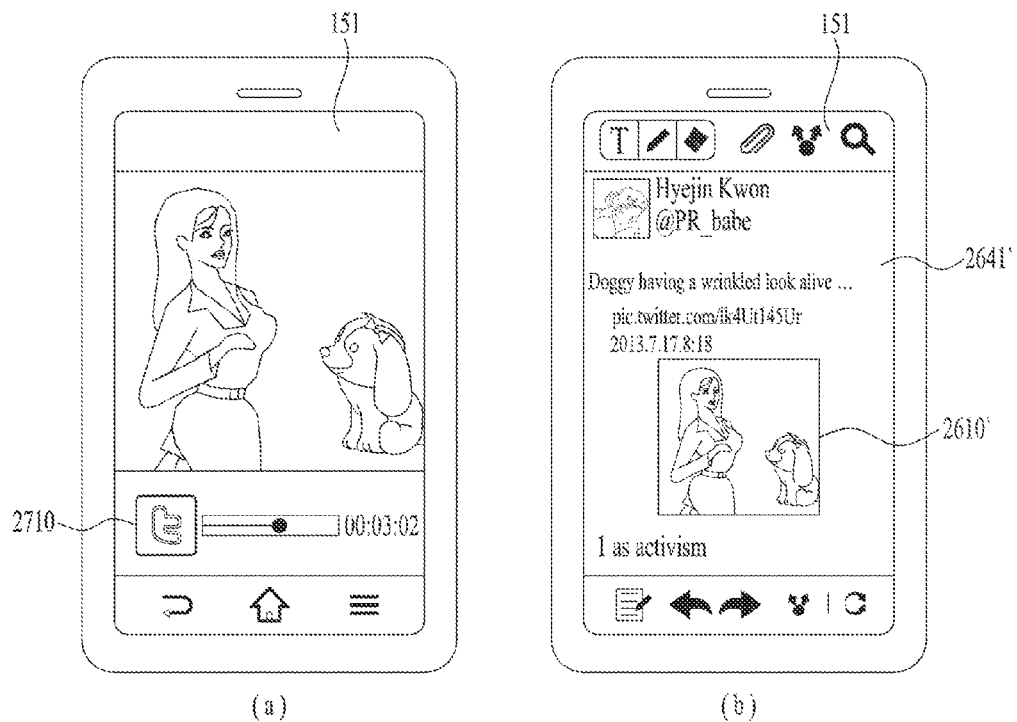

FIG. 26 and FIG. 27 are diagrams illustrating one example of a method of obtaining an audio to synthesize with an image through a social network service in a mobile terminal according to one embodiment of the present invention. Referring to FIG. 26(a), when an image 2620 is displayed, an audio synthesis icon 2620 can be selected. Hence, the controller 180 analyzes the image 2610 and then searches the memory 160 for audio candidate(s) in accordance with a determined search condition. Yet, any audio candidates satisfying the condition may not be found.

In this instance, referring to FIG. 26(b), the controller 180 can display icons 2631 and 2632 corresponding to different SNSs of two types as alternatives. Further, if a user selects a prescribed icon 2632, the controller 180 performs a search according to a search condition at a user's SNS account. Further, it is not mandatory for a search target to contain an audio. For instance, referring to FIG. 26(c), 2 texts 2641 and 2642 related to the image are displayed as search results. If the user selects one of the texts, the controller 180 converts the corresponding text to audio by TTS conversion and can then save the audio to correspond to the corresponding image. Hence, the controller 180 can control an audio icon 2650 to be displayed on the corresponding image. If the audio icon 2650 is selected, referring to FIG. 27(a), a synthesized audio can be played. Further, when the audio is played, an icon 2710 of an SNS, which becomes a source of the synthesized audio, can be displayed together. If the SNS icon 2710 is selected, referring to FIG. 27(b), a shortcut to an SNS posting, which becomes a source 2641', can be executed. In addition, an image 2610' may be additionally uploaded to the corresponding posting.

Correspondence and Play of Image and Audio

According to another embodiment of the present invention, various methods of creating and playing an audio included image content are provided. In this instance, when an image is displayed on the touchscreen, the audio included image content means a content that can be output together with an audio corresponding to the displayed image in accordance with user's selection or settings. A single image content may include at least one still image and at least one audio. For instance, a single image content may be configured with a single image and a single audio corresponding to the single image. In another instance, a single image content may be configured with a plurality of images and a plurality of audios respectively corresponding to a plurality of the images.

An image content including an audio according to an embodiment of the present invention can be saved as a single file or a plurality of files amounting to the number of images and audios configuring the corresponding image content. According to this scheme, unlike a general video, since a user-desired image is included only by maintaining an audio, video encoding is not necessary and a file size is considerably reduced in comparison with a video. Hence, storage space utilization and sharing convenience can be considerably increased. In the following description, 'image content including audio' mentioned in the present specification may be used to have the same meaning of 'image including audio' or 'image saved by having audio correspond thereto'.

According to another embodiment of the present invention, a following method is proposed. First of all, an image is created. Secondly, after an audio has been input, the created image and the input image are saved by corresponding to each other. Thirdly, when the image is displayed, the audio is played together. Particularly, according to the present embodiment, a different audio can correspond to each object included in an image.

Figure 28:
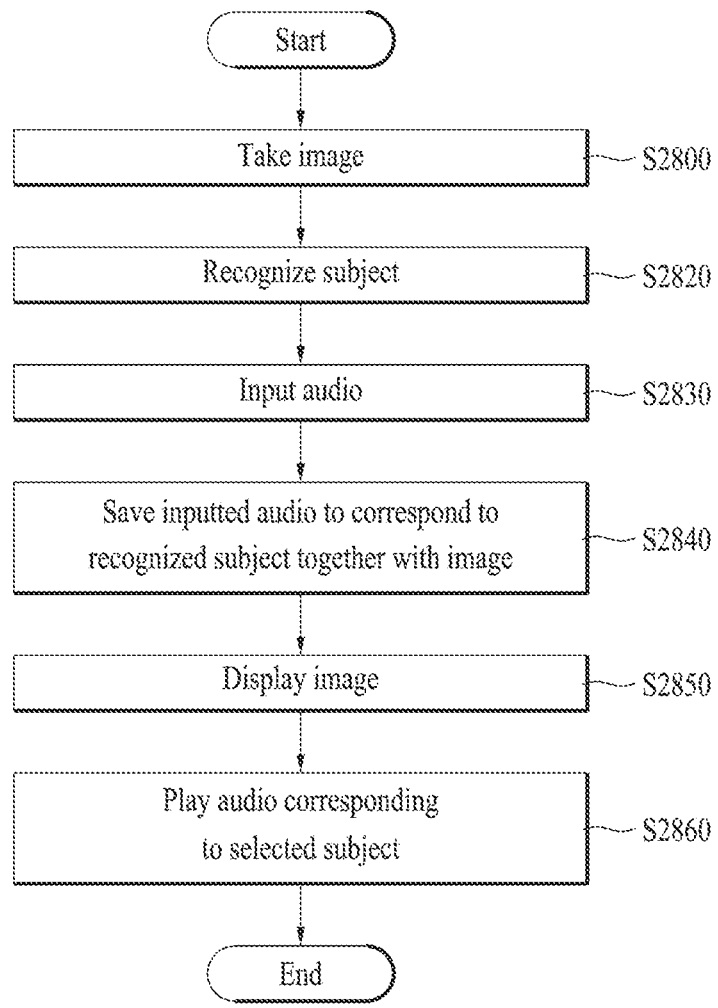
FIG. 28 is a diagram illustrating one example of a method of creating and playing an image content including an audio in a mobile terminal according to another embodiment of the present invention.

FIG. 28 is a diagram illustrating one example of a method of creating and playing an image content including an audio in a mobile terminal according to another embodiment of the present invention. Referring to FIG. 28, an image can be taken through the camera 121 (S2810). The controller 180 can recognize a subject from the taken image (S2810). In this instance, 'recognizing a subject' may mean that a subject satisfying a prescribed condition in an image can be recognized by being identified as an object to which an audio can correspond. For example of the prescribed condition, if at least one face of a person is recognized through face recognition, each recognized face can becomes a subject of the present embodiment in a corresponding image. Thus, the subject can be recognized by the controller 180. Instead, it is a matter of course that a user can directly designate at least one subject through a touch input and the like.

Thereafter, an audio can be input through the microphone 122 (S2830). In this instance, the audio can input for each of the recognized subjects. Once the audio is input, the controller 180 can control each input audio to be saved in the memory 160 corresponding to each subject (S2840).

After the saving step is completed, the image saved by corresponding to the audio can be displayed on the touchscreen 151 through an image play application or the like (S2850). While the corresponding image is displayed, if a specific subject in the image is selected by a touch input or the like, the controller 180 can output the audio, which is saved by corresponding to the selected subject, through the audio output unit 152.

Figure 29:
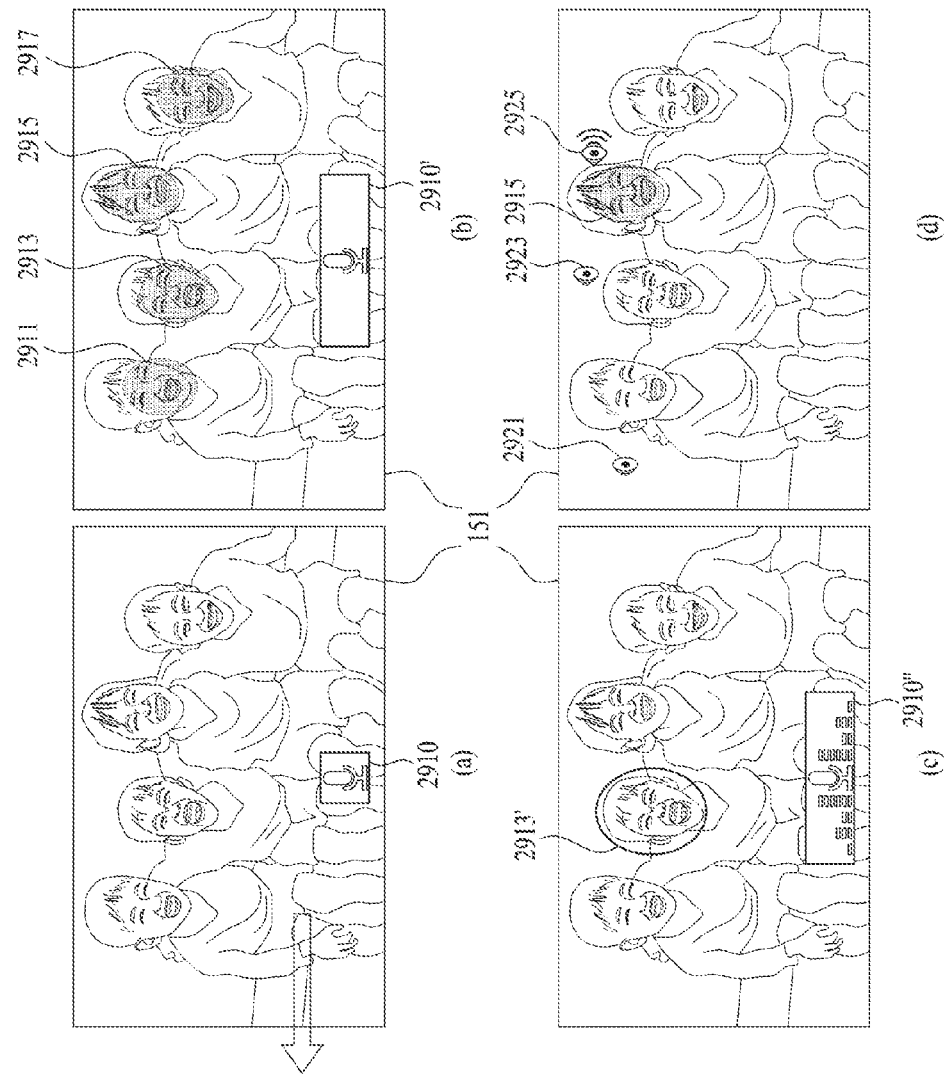
FIG. 29 is a diagram illustrating one example of a process for saving an audio to correspond to an image and playing the saved audio in a mobile terminal according to another embodiment of the present invention.

In the following description, the above-mentioned saving and playing procedures are described in detail with reference to FIG. 29. FIG. 29 is a diagram illustrating one example of a process for saving an audio to correspond to an image and playing the saved audio in a mobile terminal according to another embodiment of the present invention.

Referring to FIG. 29(a), an image taken through the camera 121 can be displayed on the touchscreen together with a record button 2910. If the record button is selected, referring to FIG. 29(b), prescribed visual effects 2911, 2913, 2915 and 2917 can be given to subjects in accordance with a result of face recognition, respectively. In this instance, as the subject recognition and the recording preparation are complete, a shape of the record button 2910' may be changed. Further, if a user intends to record a voice of a left second character, as the visual effect 2913 corresponding to the corresponding character is touched, referring to FIG. 29(c), a visual effect 2913' is displayed to indicate that the corresponding character is selected and a visual effect corresponding to an audio can be displayed on the record button 2910'' as well.

The recording may be performed while the corresponding subject is selected (i.e., while a touch input is maintained on the visual effect corresponding to the corresponding subject). Alternatively, the recording may be performed during a prescribed time after selection of the corresponding subject. Alternatively, as the controller 180 detects an audio waveform, the recording may be performed during a time in which a valid audio exists only. In this instance, the valid audio may mean an audio of which waveform difference from an audio previously input through the microphone before selection of a subject is equal to or greater than a prescribed range or an audio equal to or greater than a prescribed level (dB).

The process shown in FIG. 29(c) may be performed plural times as many as the number of maximally recognized subjects (e.g., maximum 4 times in FIG. 29). When at least two subjects are simultaneously selected, a single audio can be saved corresponding to a plurality of the selected subjects. Moreover, when a touch size or area is equal to or greater than a predetermined size, a single audio can be saved corresponding to all subjects.

If an audio is separately recorded and saved for each of the subjects respectively corresponding to the visual effects 2911, 2913, 2915 and 2917, a corresponding image will be displayed in configuration, as shown in FIG. 29(d), on the touchscreen. In particular, icons 2921, 2923 and 2925 in prescribed configurations can be displayed around the subjects saved corresponding to audios, respectively. Further, when a user intends to play the audio corresponding to the third character from a left side, if the user touches a region for displaying the third character on the touchscreen or the icon 2925 corresponding to the third character, the audio saved corresponding to the corresponding character can be output through the audio output unit 152 together with the visual effect 2915 indicating the selection.

If a touch input is simultaneously applied to the three icons 2921, 2923 and 2925 or a touch input having a contact size equal to or greater than a predetermined size is recognized, the audios corresponding to the three characters may be simultaneously played. Of course, although any subjects are not selected, the audios can be sequentially played in order of recording in accordance with settings. Moreover, using STT function, a text corresponding to a currently output audio can be displayed around a subject corresponding to the currently output audio.

Meanwhile, according to another aspect of the present embodiment, although consecutive photographing is performed or a plurality of previously saved images exist, different audios can be set to correspond to images, respectively. This is described in detail with reference to FIG. 30 as follows.

Figure 30:
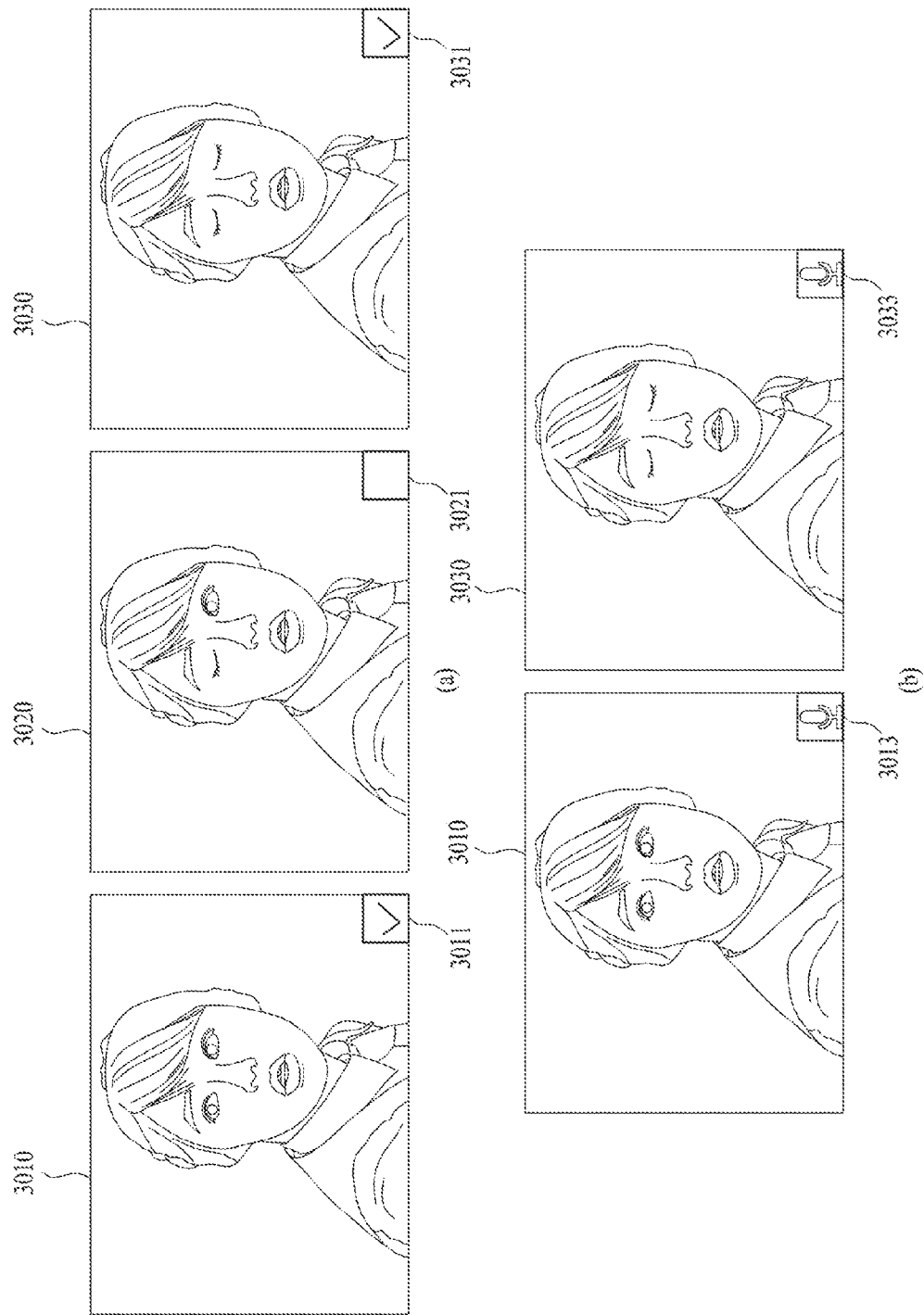
FIG. 30 is a diagram illustrating one example of a method of saving audios to correspond to a plurality of images respectively in a mobile terminal in another aspect according to another embodiment of the present invention.

FIG. 30 is a diagram illustrating one example of a method of saving audios to correspond to a plurality of images respectively in a mobile terminal in another aspect according to another embodiment of the present invention. Referring to FIG. 30(*a*), as photographing through the camera 121 in consecutive photographing mode is completed, three consecutively taken images 3010, 3020 and 3030 can be displayed on the touchscreen together. Further, check boxes 3011, 3021 and 3031 can be provided to the three images 3010, 3020 and 3030, respectively. In this instance, if a user intends to use the first image 3010 and the third image 3030, the user can select the corresponding check boxes 3011 and 3031.

Hence, referring to FIG. 30(*b*), the checked images are displayed on the touchscreen only. If record icons 3013 and 3033 respectively provided to the checked images 3010 and 3030 are selected, audios can be recorded to correspond to the images 3010 and 3030, respectively. For instance, the audio to correspond to the first image 3010 can be recorded while the record icon 3013 is selected. In another instance, the audio to correspond to the first image 3010 can be recorded during a time that meets a prescribed condition after the corresponding selection. If the audio input for each of the images is completed, the two images can be saved as a single moving image (e.g., a flash file, a GIF file, etc.) in the memory 160.

If a command for outputting the saved image is input (e.g., if the saved image is selected from a gallery application), the first image 3010 and the third image 3030 can be alternately displayed. In addition, a time for displaying each of the images can correspond to a time for recording the corresponding audio. In particular, while the audio corresponding to the first image is played, the first image keeps being displayed. If the play of the corresponding audio is completed, the third image is displayed and the audio corresponding to the third image can be output as well. If the output of the audio corresponding to the third image is completed, the first image is redisplayed and the audio corresponding to the redisplayed first image can be repeatedly played as well.

FIG. 30 illustrates one example of three images as a result of the consecutive photographing, by which the present embodiment is non-limited. For instance, more or less images can be displayed depending on the photographing number supported in consecutive photographing mode. Besides, the present embodiment can be implemented if a plurality of images are selected from the images saved in the memory 160 as well as the consecutively photographed images.

According to further embodiment of the present invention, an image including an audio can be created in a following manner. First of all, at least one image and at least one audio are separately extracted from a previously saved source video. Secondly, each of the extracted images and each of the extracted audios are matched to each other. This is described in detail with reference to FIG. 31 as follows.

Figure 31:
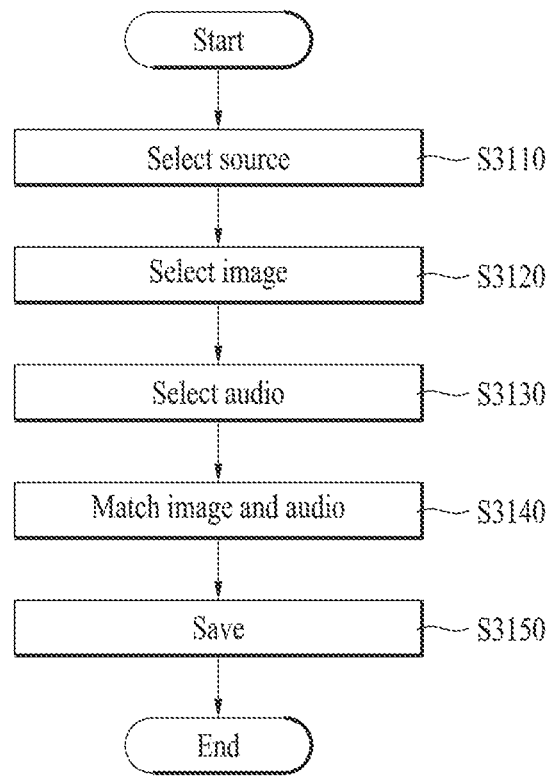
FIG. 31 is a flowchart illustrating one example of a method of extracting an image and an audio from a source video and saving them to correspond to each other according to further embodiment of the present invention.

FIG. 31 is a flowchart illustrating one example of a method of extracting an image and an audio from a source video and saving them to correspond to each other according to further embodiment of the present invention. Referring to FIG. 31, a source video can be selected (S3110). In this instance, the source video may be selected from a video list displayed through a video play application or an application dedicated to creation of an image including audio according to the present embodiment.

If the source video is selected, a ply of the source video can be initiated and an image and audio can be selected in the course of playing the source video (S3120, S3130). Of course, the play can be sequentially performed in order of time from the beginning or may be performed in response to a user's play time change command (e.g., pause, fast forward, fast rewind, slow play, etc.). The image can be extracted by capturing an image displayed at a specific timing point of a video and the audio can be extracted by sampling or cropping an audio output in a specific time interval.

If the selection of the image and audio from the corresponding source video is completed, a matching of the selected image and audio can be performed (S3140). Subsequently, a result of the image and audio matching, i.e., an image content including the audio can be saved as a file of a prescribed format in the memory 160 (S3150).

In the following description, a process for creating the image content including the audio mentioned in the foregoing description with reference to FIG. 31 is explained in detail with reference to FIG. 32.

FIG. 32 is a diagram illustrating one example of a method of creating an image content including an audio using a video source in a mobile terminal according to further embodiment of the present invention. Referring to FIG. 32(*a*), a user interface for extracting an image and audio from a video according to the present embodiment is illustrated. In particular, when a video selected as a source video is played on the touchscreen 151, an image extract (capture) button 3210 for extracting an image by capturing a currently displayed image and an audio extract button 3220 for sampling a currently output audio can be displayed on one side end of the touchscreen 151.

In addition, a progress bar 3230 indicating a current play timing point over a total playtime of the source video can be displayed on a bottom end of the touchscreen 151. A thumbnail 3241 of the image captured by the selection of the image extract button 3210 and indicators 3251, 5252 and 3253 of the audios extracted by the selections of the audio extract button 3220 can be displayed at locations corresponding to the button selected timing points on the progress bar 3230, respectively. In particular, FIG. 32(*a*) shows a situation that a single image and three audios are extracted from a source video.

In the situation shown in FIG. 32(*a*), If the video play is completed after a single image has been further captured, or if an extraction complete command of a preset type is input, referring to FIG. 32(*b*), thumbnails 3241' and 3242' respectively corresponding to the images extracted from the corresponding source video and audio icons 3251', 3252' and 3253' respectively corresponding to the extracted audios can be displayed. If a user drags one of the thumbnails to one of the audio icons, and vice versa, the corresponding image and audio can be matched to each other. The images corresponding to the matching completed thumbnails and the audios corresponding to the audio icons can be saved in the memory 160 as image contents according to an embodiment of the present invention.

In the following description, a process for playing an image content including audio created and saved through the foregoing embodiments and additional functions runnable by this process are explained in detail with reference to FIG. 33 and FIG. 34.

Figure 33:
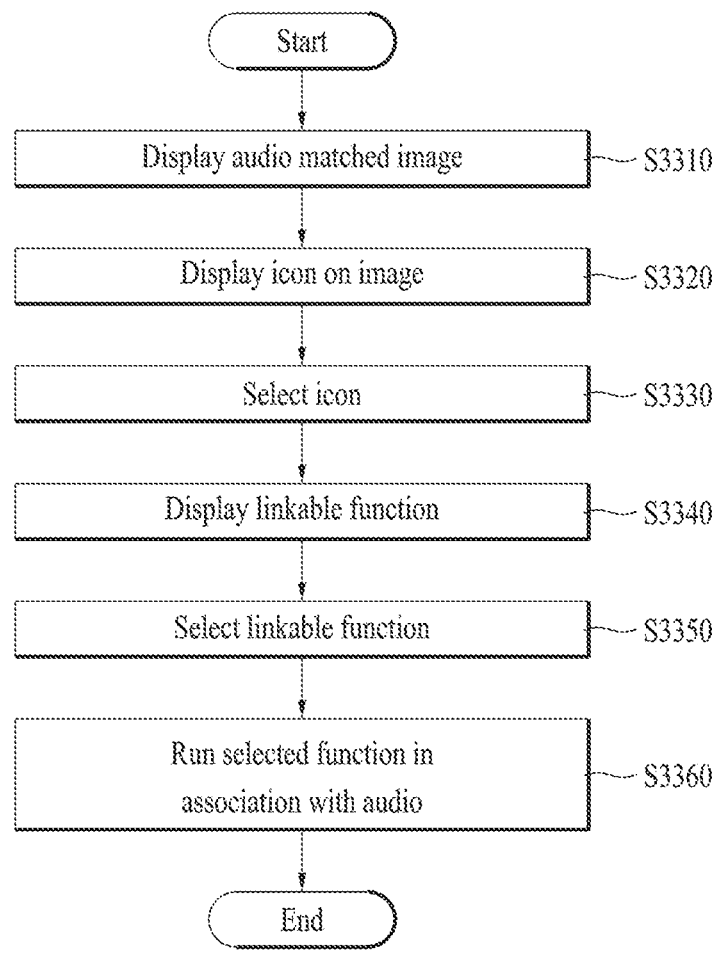
FIG. 33 is a flowchart illustrating one example of a process for performing an additional function on playing an image content including an audio in a mobile terminal according to at least one embodiment of the present invention.

FIG. 33 is a flowchart illustrating one example of a process for performing an additional function on playing an image content including an audio in a mobile terminal according to at least one embodiment of the present invention. Referring to FIG. 33, an image content saved in the memory 160 can be displayed through an application (e.g., a gallery application, etc.) for playing an image content including audio according to an embodiment of the present invention (S3310). As mentioned in the foregoing description, the audio included in the displayed image content can be automatically played as soon as the image is displayed. In addition, the audio included in the displayed image content can be played in response to a user's command input.

Further, an icon for paging a linked function can be displayed in response to a user's command input, in accordance with settings, or automatically (S3320). If the displayed icon is selected (S3330), a list of functions runnable by being linked to the audio included in the corresponding image content can be displayed (S3340). In this instance, the function runnable by being linked to the audio may mean a function runnable by associating the audio with an information extracted (e.g., converted to a text) through STT function. For instance, if a place name is included in an audio, a function based on a location information related to the place name may correspond to the function runnable by being linked to the audio. If a contact related information is included, a communication related function such as an address book and the like may correspond to the function runnable by being linked to the audio. If a prescribed function is selected from the functions included in the list by the user (S3350), the selected function can be run for the information extracted from the audio (S3360).

In the following description, a process for performing an additional function in accordance with a selection of an icon is explained in detail with reference to FIG. 34. FIG. 34 is a diagram illustrating one example of a process for performing an additional function in association with an audio matched to an image in a mobile terminal according to at least one embodiment of the present invention.

Figure 34:
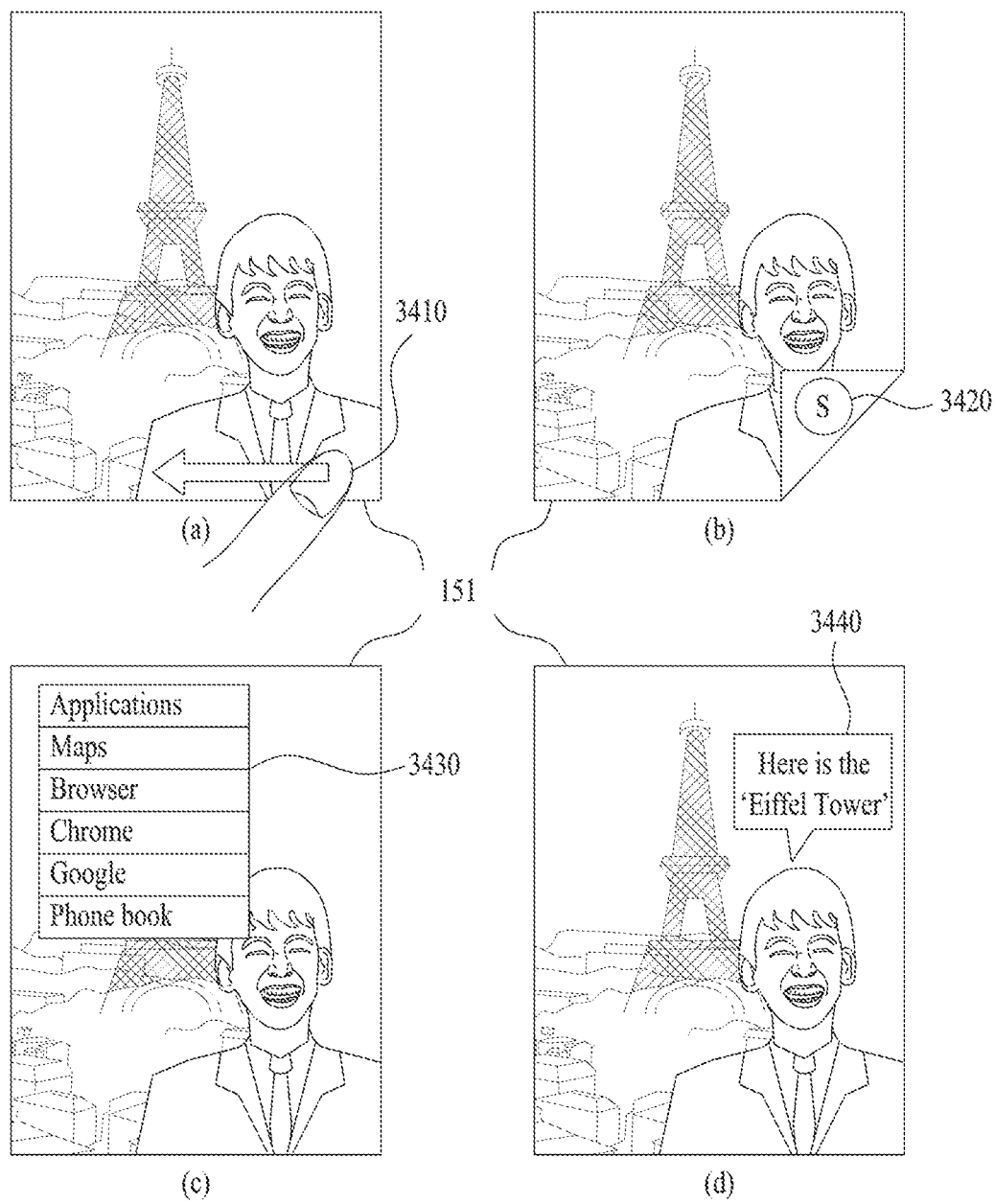
FIG. 34 is a diagram illustrating one example of a process for performing an additional function in association with an audio matched to an image in a mobile terminal according to at least one embodiment of the present invention.

Referring to FIG. 34(*a*), an image content saved in the memory 160 can be displayed on the touchscreen 151 through an application capable of playing an image content including audio. Further, if a flicking touch input with a pointer 3410 to an edge of the touchscreen 1511 is detected, referring to FIG. 34(*b*), the controller 180 can control an icon 3420, which is provided to page an additional function, to be displayed at the corresponding location. If the icon 3420 is selected, referring to FIG. 34(*c*), a list 3430 of functions runnable in association with information extracted from the audio included in the corresponding image content can be displayed.

For instance, when a substance of the audio is 'Here is the Eiffel Tower.', if a map application is selected, a location information including 'Eiffel Tower' can be displayed through the map application. If a browser application is selected, a web search can be performed using 'Eiffel Tower' as a keyword. In another instance, when a substance of the audio is 'My phone number is 010-111101111.', if a contact application is selected, the corresponding phone number can be saved. If a message application is selected, a mode for sending a message to the corresponding phone number can be entered.

Meanwhile, according to further embodiment of the present invention, an additional function can be run without being linked to another application. For instance, if the mobile terminal is currently in vibration or silence mode, referring to FIG. 34(*d*), the controller 180 converts the audio included in the image content to a text and the outputs it to the touchscreen 151 instead of playing the audio through the audio output unit 152.

Meanwhile, according to the embodiments mentioned in the foregoing description, when an image content including an image and an audio is saved in a memory, the audio and the image are saved as separate files, respectively or can be saved as a single file. For instance, when a single audio corresponds to a single image, a corresponding content can be saved as a single jpg file and a single mp3 file. In another instance, when different audios correspond to two images, respectively, a corresponding content can be saved as two jpg files and two mp3 files, as a single gif file and two mp3 files, or as a single flash file. When such an image content is played, whether an audio is included in the corresponding content can be determined by a play application based on whether an audio file having a file name, of which at least one portion is identical, exists in a header information of an image file or on a same storage path.

Accordingly, the present invention provides the following effects and/or features. First of all, when an image is displayed, an audio corresponding to the image can be output together. In particular, the audio can correspond to each object of the image. In addition, audios are conveniently extracted from various sources and then synthesized with image.

Moreover, various additional functions can be provided through audio corresponding to an image. In addition, an additional function of a different type can be provided depending on a use environment.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be performed without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
displaying an image on a touchscreen of the mobile terminal;
searching at least one of audio candidates related to the displayed image from at least one multimedia file;
displaying a list of at least one of the searched audio candidates, the list comprising a thumbnail corresponding to the multimedia file;
receiving a selection of at least one of audio candidates from the displayed list;
saving an audio of the selected audio candidates in association with the image;
displaying an indicator on the touchscreen indicating the at least one audio candidate is saved with the image;
in response to a first type of input of the indicator, playing the saved audio; and
in response to a second type of input, adding a shortcut to a source content corresponding to the saved audio.

2. The method of claim 1, wherein the at least one multimedia file is included in at least one of a music file, a recording file, a video file and a streaming content.

3. The method of claim 1, wherein the thumbnail comprises a play menu button, and
wherein if the play menu button of the thumbnail is selected, the method further comprises playing the audio candidate corresponding to the selected thumbnail.

4. The method of claim 3, further comprising:
when the audio candidate corresponding to the selected thumbnail is played, and in response to a first touch input, changing a play timing point of the played audio candidate; and
in response to a second touch input, playing another audio candidate.

5. The method of claim 1, wherein the at least one audio saved in association with the image comprises an audio candidate having a highest association degree with the image among a plurality of searched audio candidates.

6. The method of claim 1, further comprising:
receiving a selection of a specific object from the image; and
saving an audio of a prescribed audio candidate in association with the selected object.

7. The method of claim 1, further comprising:
selecting the at least one audio candidate based on at least one of a use frequency of an audio saved in association with a different image similar to the selected image, a tag set for the selected image, a file name of the selected image, a recognition result of an object included in the selected image, a created time of the selected image, or a created place of the selected image.

8. A mobile terminal, comprising:
a touchscreen configured to display an image; and
a controller configured to:
search for at least one of audio candidates related to the displayed image from at least one multimedia file,
display a list of at least one of the searched audio candidates on the touchscreen, the list comprising a thumbnail corresponding to the multimedia file,
receive a selection of at least one of audio candidates from the displayed list,
save an audio of the selected audio candidates in association with the image,
display an indicator on the touchscreen indicating the at least one audio candidate is saved with the image,
in response to a first type of input of the indicator, play the saved audio, and
in response to a second type of input, add a shortcut to a source content corresponding to the saved audio.

9. The mobile terminal of claim 8, wherein the at least one multimedia file is included in at least one of a music file, a recording file, a video file and a streaming content.

10. The mobile terminal of claim 8, wherein the thumbnail comprises a play menu button, and
wherein if the play menu button of the thumbnail is selected, the controller is further configured to play the audio candidate corresponding to the selected thumbnail.

11. The mobile terminal of claim 10, wherein the controller is further configured to:
when the audio candidate corresponding to the selected thumbnail is played, and in response to a first touch input, change a play timing point of the played audio candidate; and
in response to a second touch input, play another audio candidate.

12. The mobile terminal of claim 8, wherein the at least one audio saved in association with the image comprises an audio candidate having a highest association degree with the image among a plurality of searched audio candidates.

13. The mobile terminal of claim 8, wherein the controller is further configured to:
receive a selection of a specific object from the image, and
save an audio of a prescribed audio candidate in association with the selected object.

14. The mobile terminal of claim 8, wherein the controller is further configured to:
select the at least one audio candidate based on at least one of a use frequency of an audio saved in association with a different image similar to the selected image, a tag set for the selected image, a file name of the selected image, a recognition result of an object included in the selected image, a created time of the selected image, or a created place of the selected image.

* * * * *